Oct. 25, 1938.   W. T. B. ROBERTS   2,134,148
LASTING MACHINE
Filed Nov. 9, 1936   13 Sheets-Sheet 4
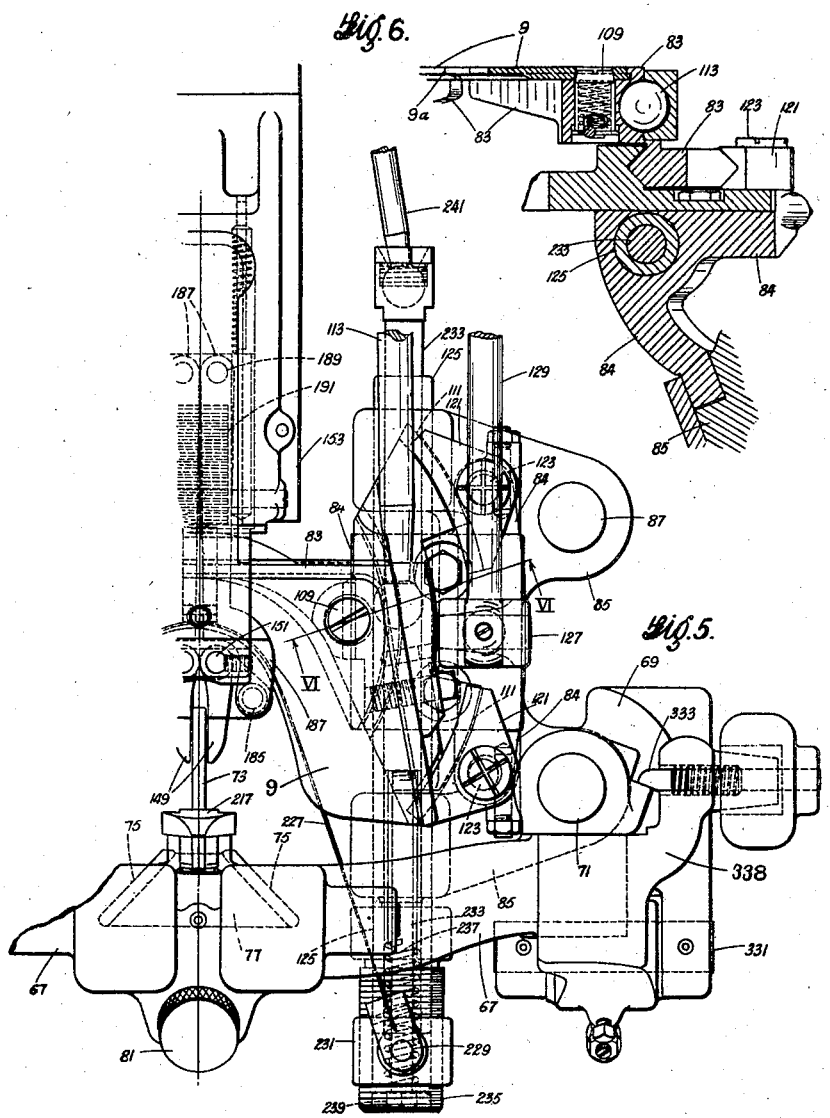
INVENTOR
William T. B. Roberts
By his attorney
Victor Cobb

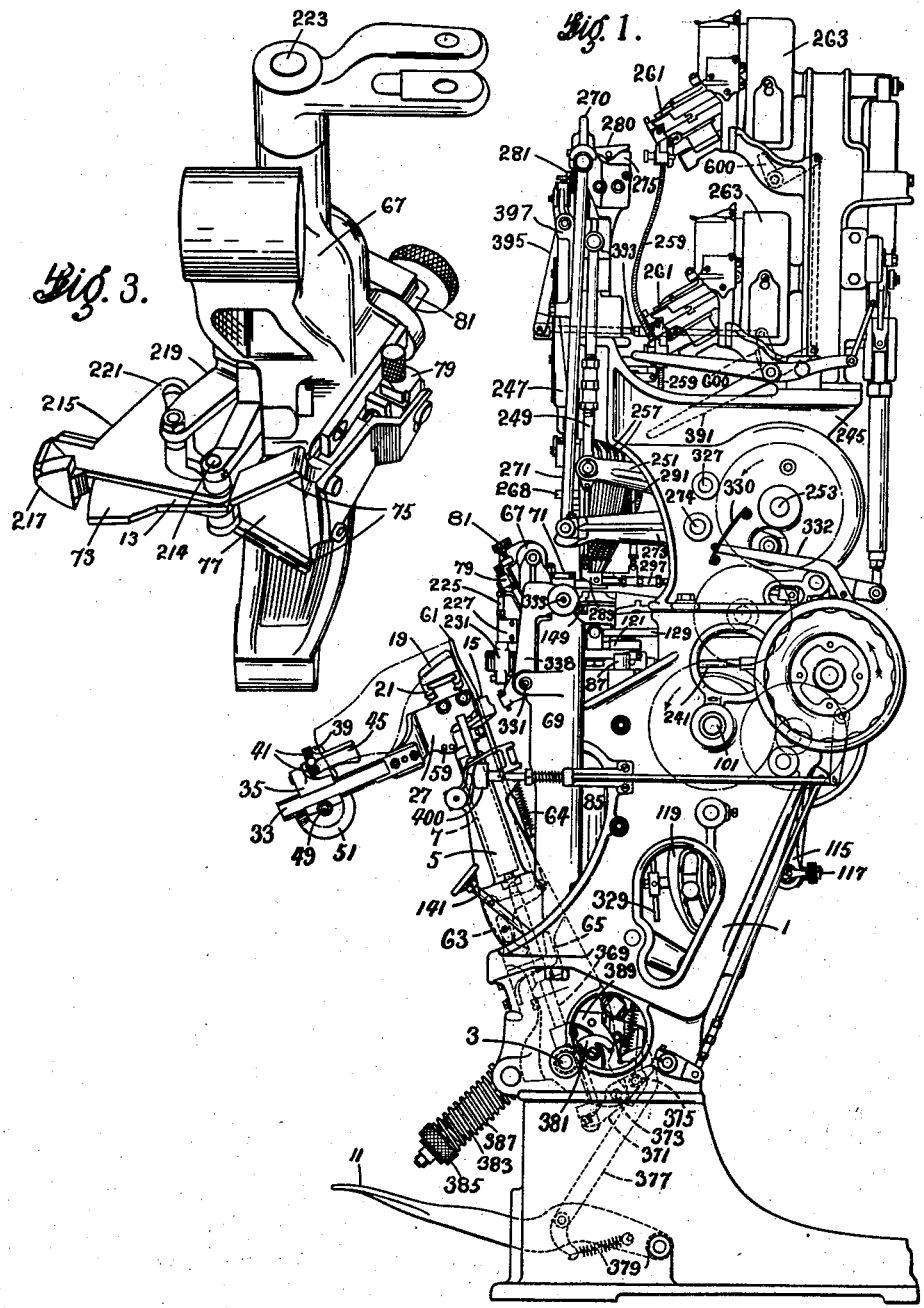

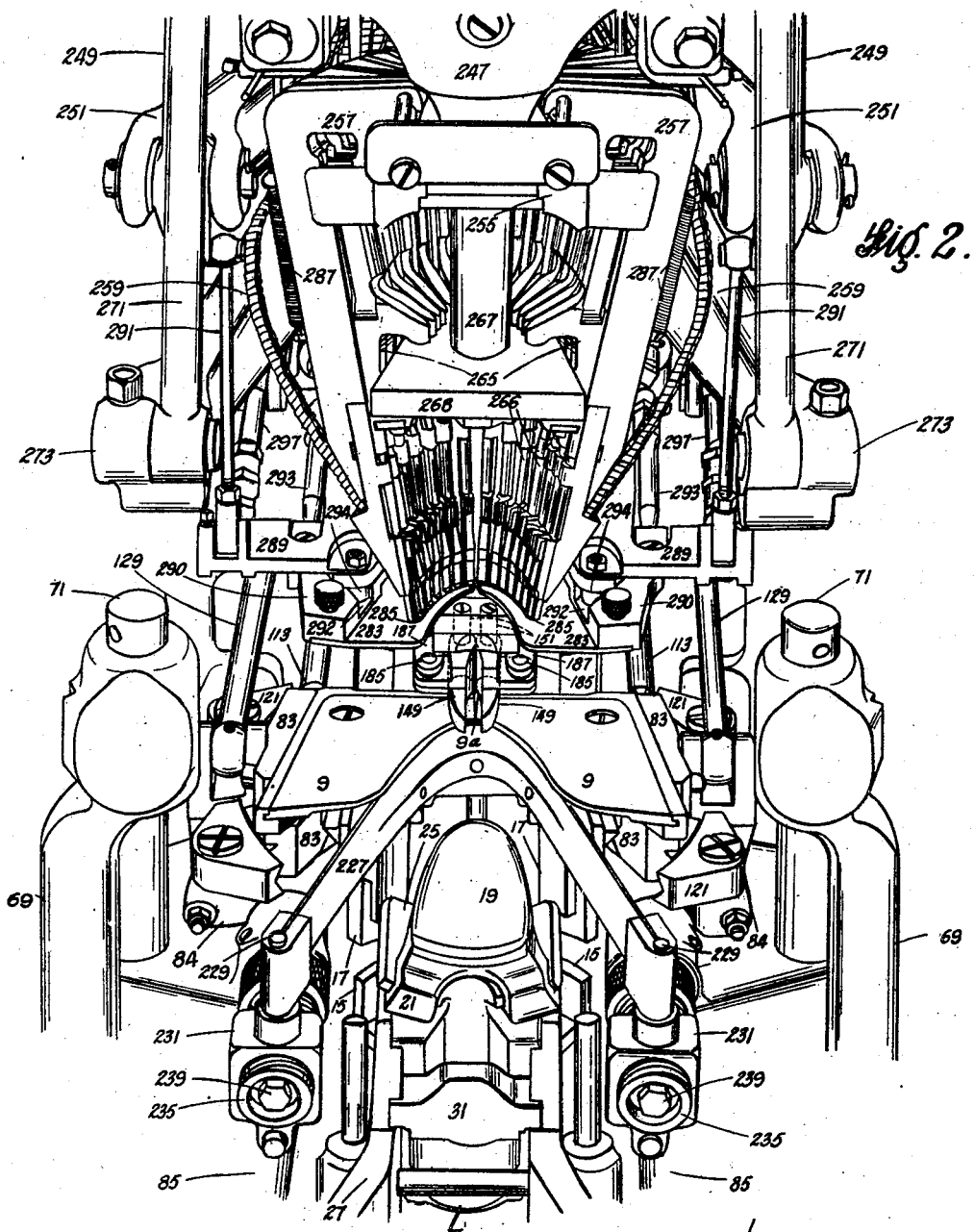

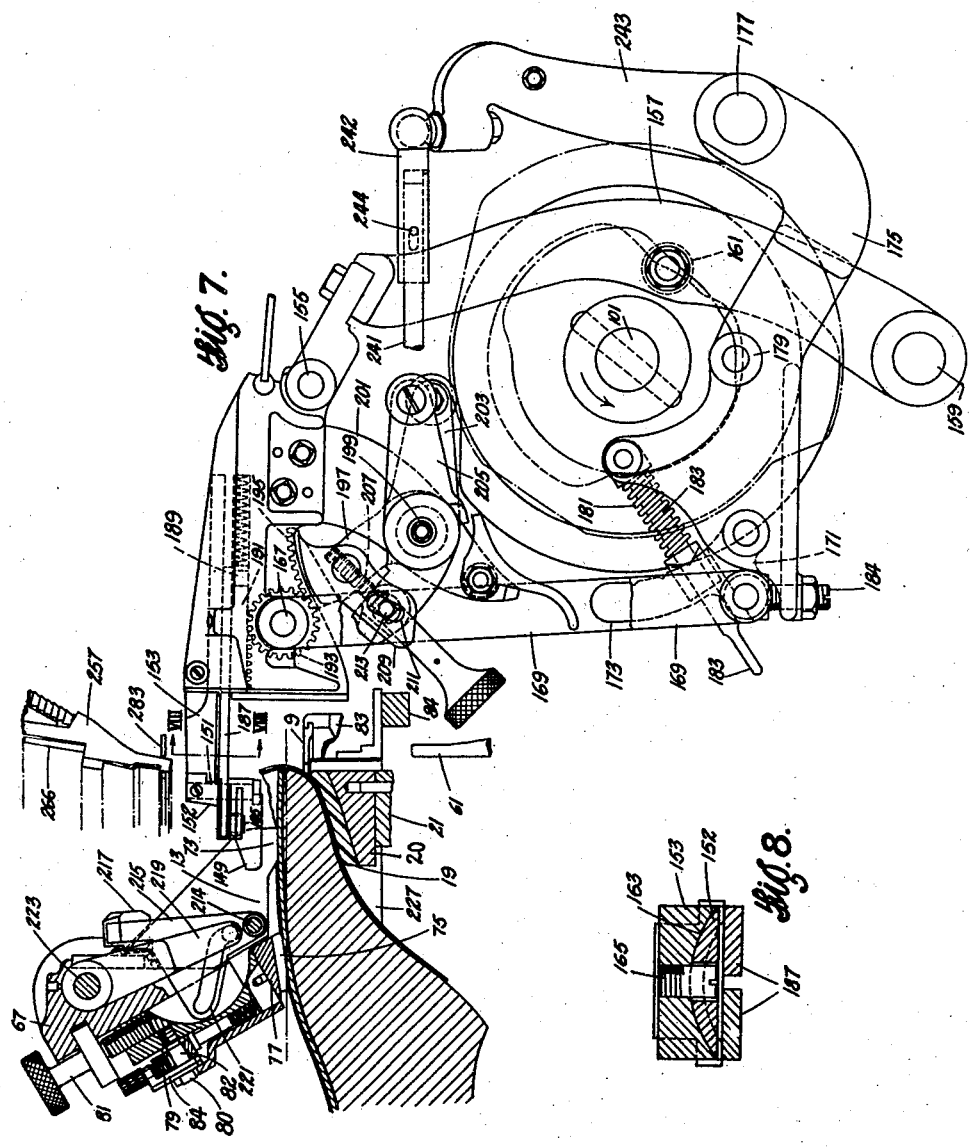

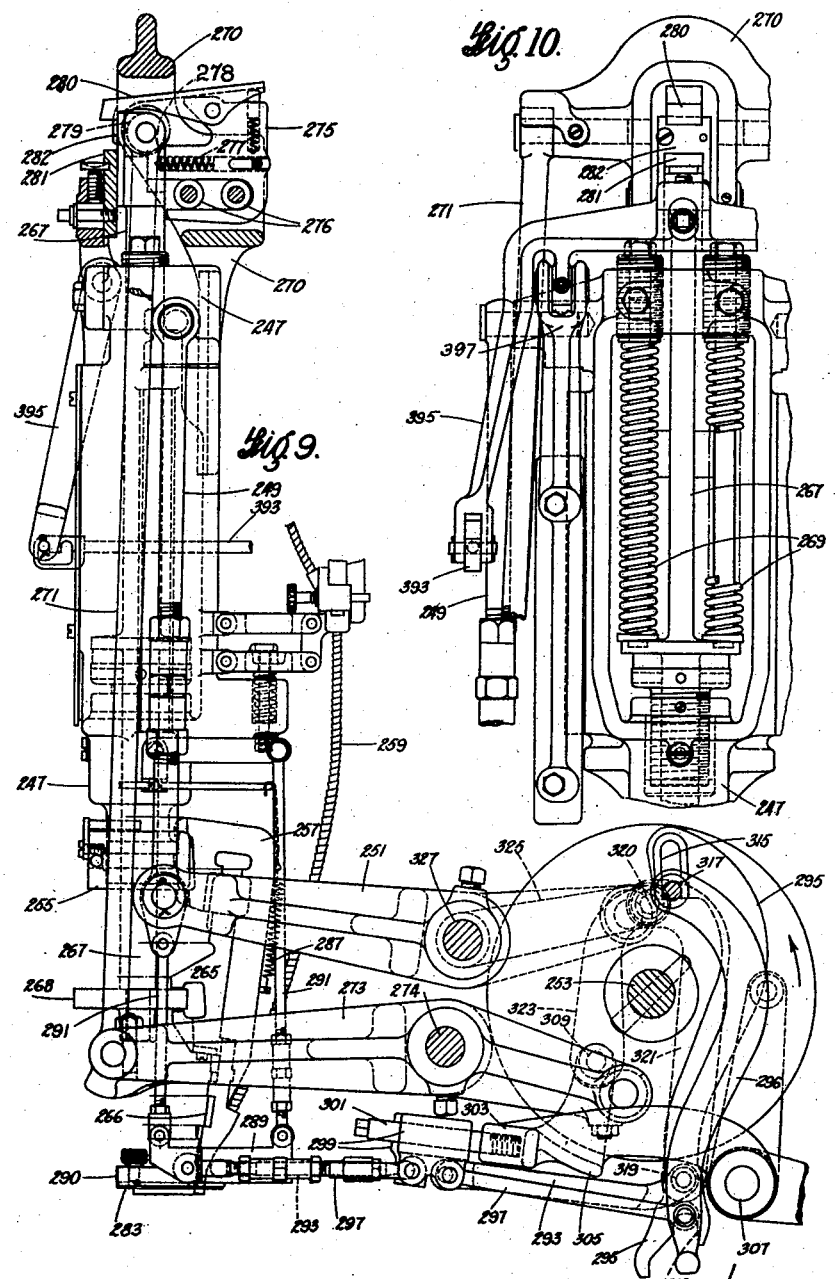

Oct. 25, 1938.                W. T. B. ROBERTS                2,134,148
                                LASTING MACHINE
                         Filed Nov. 9, 1936        13 Sheets-Sheet 7
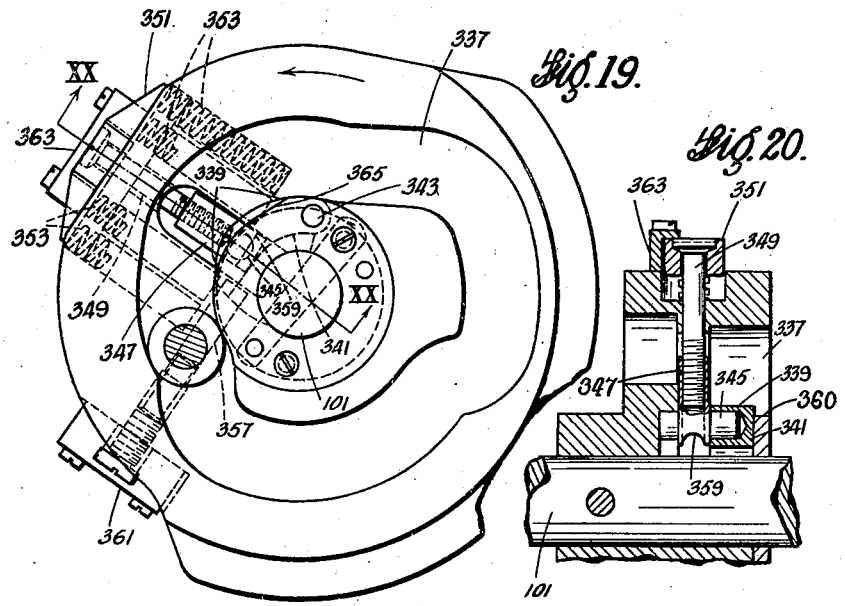
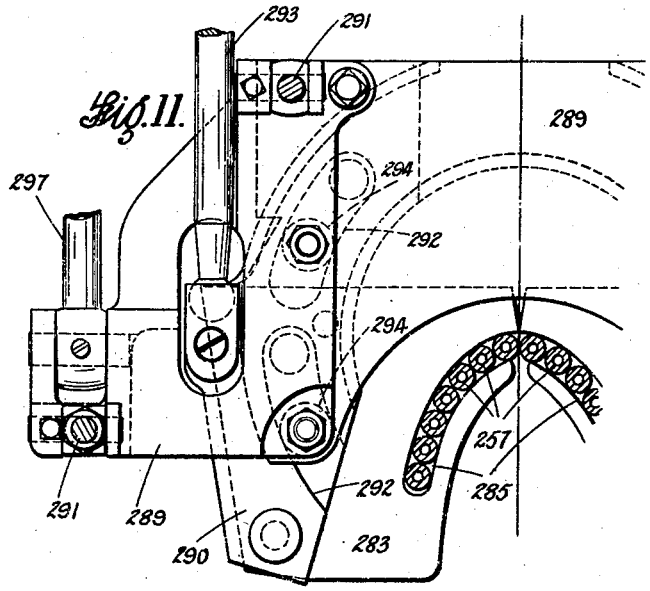
INVENTOR
William T. B. Roberts
By his attorney
Victor Cobb

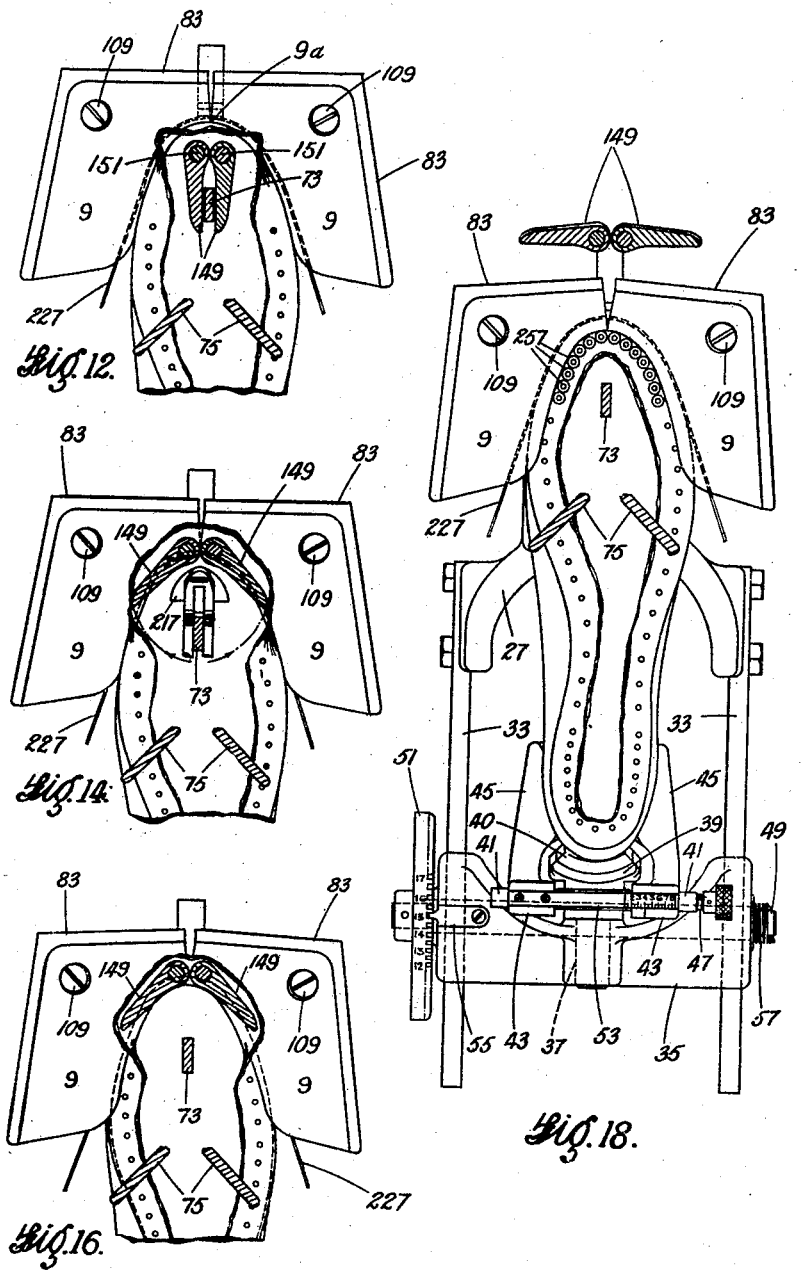

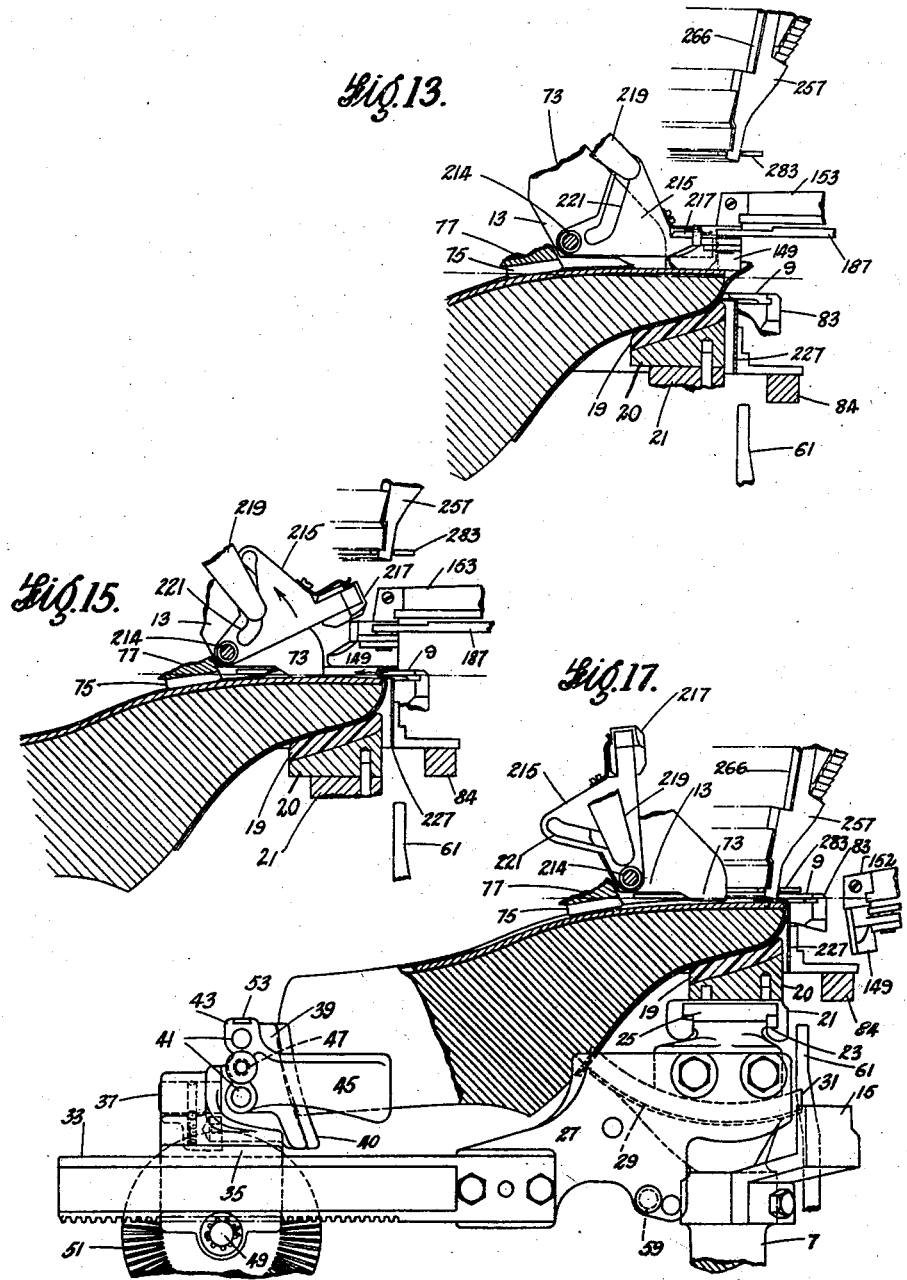

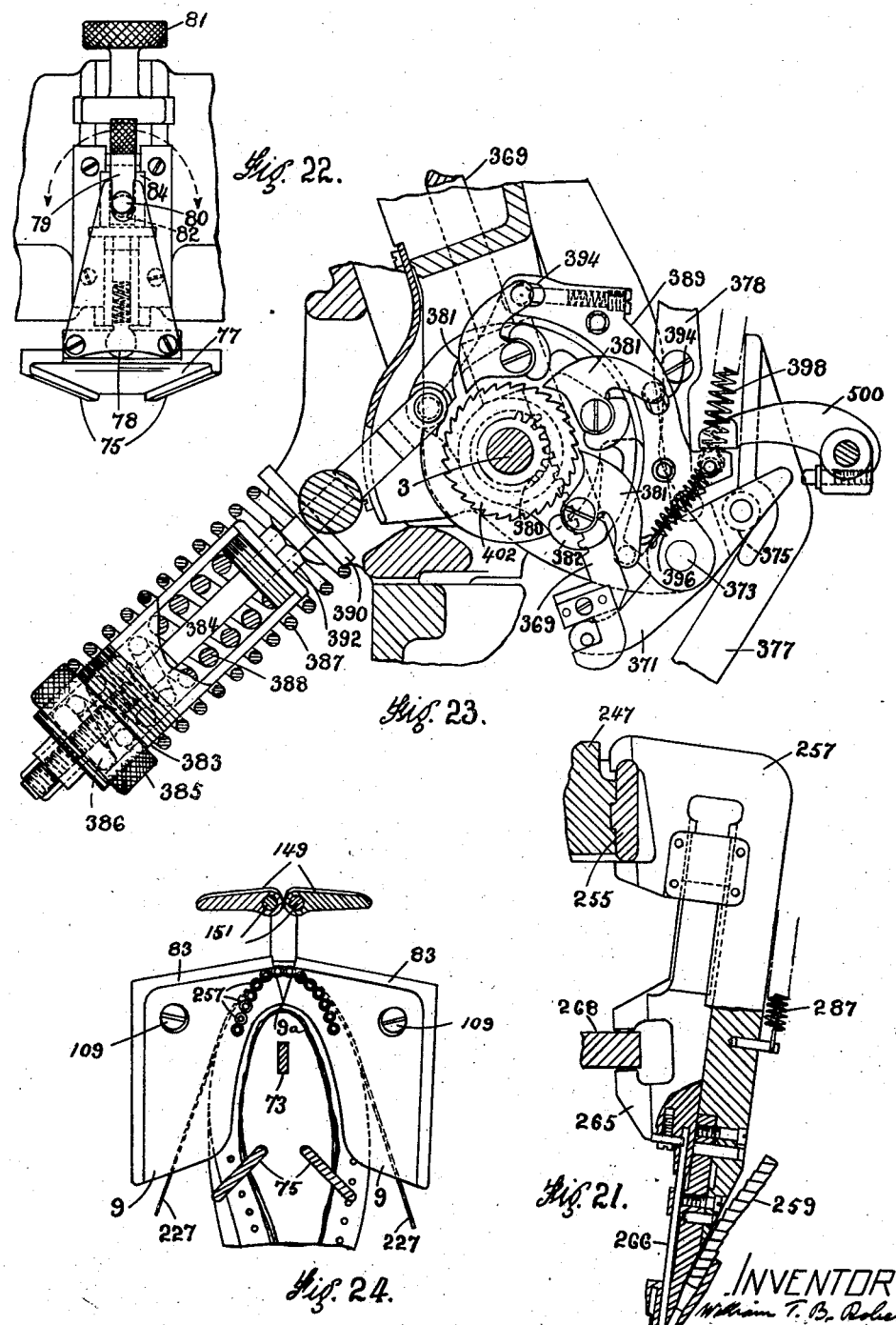

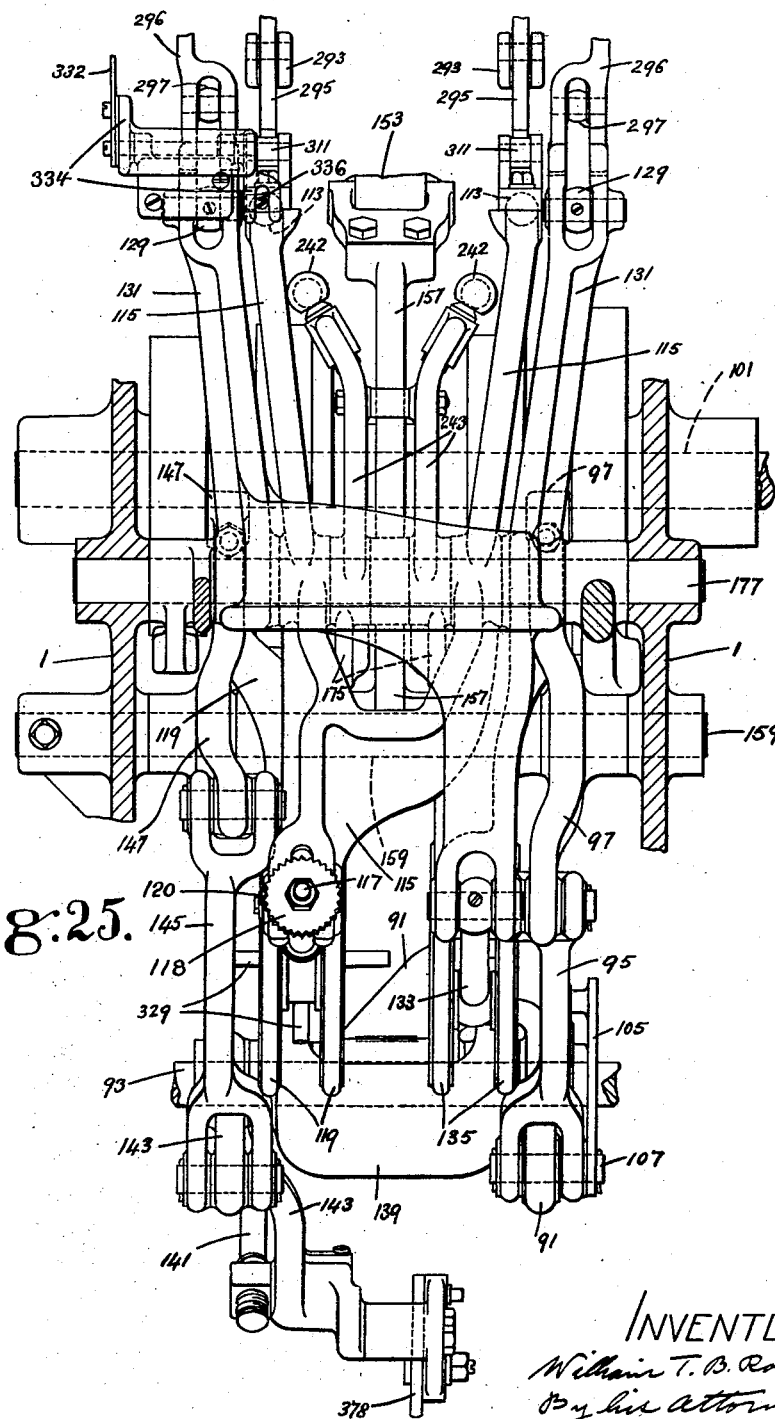

Oct. 25, 1938. W. T. B. ROBERTS 2,134,148
LASTING MACHINE
Filed Nov. 9, 1936 13 Sheets-Sheet 12
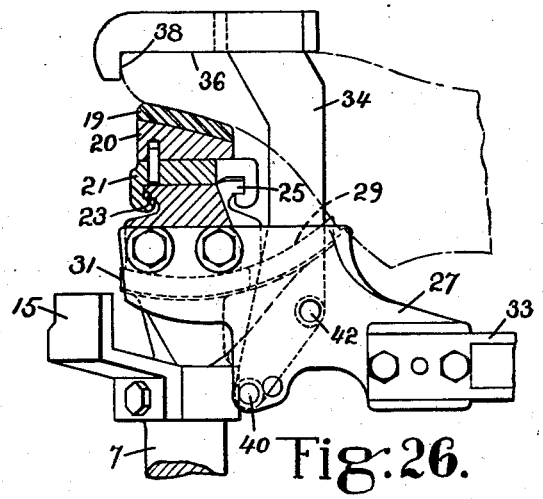
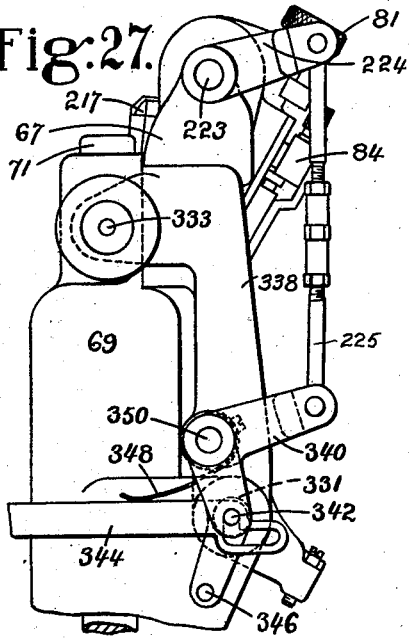
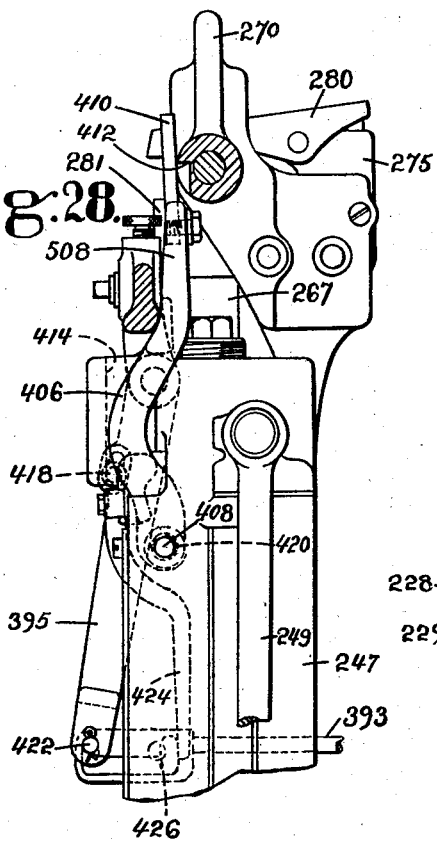
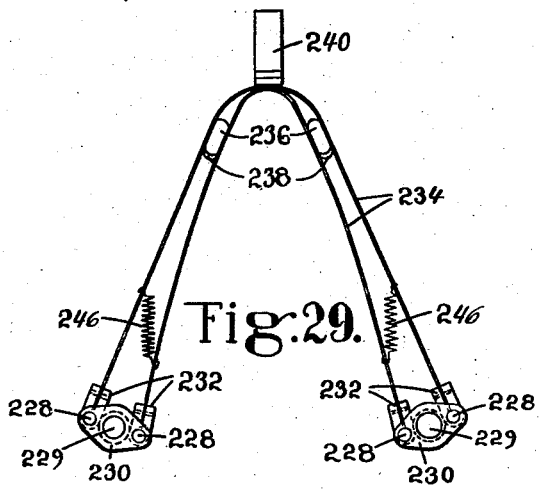
INVENTOR
William T. B. Roberts
By his Attorney
Victor Cobb Patented Oct. 25, 1938

2,134,148

UNITED STATES PATENT OFFICE 2,134,148

LASTING MACHINE

William Thomas Buckingham Roberts, Leicester, England, assignor to United Shoe Machinery Corporation, Paterson, N. J., a corporation of New Jersey Application November 9, 1936, Serial No. 109,828
In Great Britain November 20, 1935

76 Claims. (Cl. 12—4)

This invention relates to lasting machines, and is herein illustrated as embodied in a machine for lasting the toe ends of shoes. The machine herein shown is more particularly adapted for use on shoes of a type in which the margin of the toe end of the upper in lasted position lies throughout its width in generally parallel relation to the bottom of the last over an insole on the last, and is provided with means for inserting a plurality of fastenings around the toe end of the shoe bottom to fasten the upper. It will be understood, however, that in various novel aspects the invention is not limited to machines for operating on shoes of that particular type or to means for lasting the toe ends of shoes as distinguished, for example, from the heel ends.

In accordance with one feature, the invention provides a novel organization of end-lasting wipers and fastening-inserting devices, with provision for moving these devices relatively to the wipers from retracted positions into positions for inserting the fastenings. As herein illustrated, the fastening-inserting devices are maintained well away from the wipers as the latter are advanced and closed to wipe the margin of the upper inwardly over the shoe bottom, so as to avoid interference with means which cooperates with the wipers in controlling the upper, and to bring them into operative positions they are moved heightwise of the shoe toward the wipers, inwardly across the wiper edges, and farther heightwise of the shoe to press on the margin of the upper beyond the inner edges of the wipers which are at that time somewhat retracted from their innermost positions to uncover a portion of the margin where the fastenings are to be inserted. As further herein illustrated, the several fastening-inserting devices are suspended at their upper ends above the wipers for inward and outward swinging movements, and such movements are imparted to them by members which are movable lengthwise and laterally of the shoe in paths similar to the paths of movement of the wipers.

The invention further provides novel upper-spreading means arranged to clamp the margin of the upper outspread upon the wipers to assist in controlling it as the wipers are moved inwardly over the shoe bottom. In the construction shown the upper-spreading means comprises fingers which clamp the upper respectively on the different wipers and are arranged to swing outwardly over the wipers about axes located approximately at the end of the toe and also to move bodily lengthwise of the shoe. As the wipers wipe the upper inwardly the fingers are first held stationary, after which they are swung outwardly and are then moved bodily in an outward direction lengthwise of the shoe as their swinging movements continue. The margin of the upper is thus wiped outwardly over the wipers by the fingers in directions substantially perpendicular to the different portions of the wiper edges to insure against the formation of objectionable pleats or wrinkles as well as to increase the effectiveness of the wipers in wiping the upper tightly inward over the shoe bottom. As further herein illustrated, the wipers are utilized to wipe the upper heightwise of the toe (i. e., to upwipe the upper) before wiping its margin inwardly, and the spreading fingers are so controlled as to clamp the upper upon the wipers only near the end of the upwiping action of the wipers, after which they cooperate with the wipers to apply a heightwise pull to the upper.

To control the pressure of the wipers on the upper at the sides of the toe in the wiping of the upper heightwise of the toe the machine is provided, in accordance with another feature of the invention, with novel cam means having a yieldable portion for holding the wipers yieldingly against the upper in that operation, another portion of the cam means being arranged to close the wipers positively inward over the shoe bottom. The wipers are thus permitted in the upwiping operation to accommodate themselves to such curvatures heightwise of the shoe as there may be at the sides of the toe end of the last. Under some conditions, however, as in operating upon comparatively delicate uppers, it may be desirable that the wipers be positively controlled instead, while adjusted to bear effectively on only the widest portions of the toe, and accordingly there is provided means for rendering the yieldable cam portion unyieldable at the will of the operator. In operating upon heavy uppers it may be desirable that the wipers be not only positively controlled, but also maintained in effective wiping contact with the upper throughout the upwiping operation, and the invention therefore further provides means whereby the yieldable cam portion may be held in an inactive position, the wipers being then controlled by a positively acting cam portion so formed as to close them inward somewhat near the end of the upwiping operation so that they will maintain effective pressure on the upper notwithstanding the inward curvature of the sides of the last toward the edge of the shoe bottom.

In a further aspect, the invention has in view such control of the shoe that without special care or skill on the part of the operator each shoe will be positioned in proper relation to the lasting means for the best results in the lasting operation. The machine herein shown is provided with a jack mounted for swinging movement to carry the shoe lengthwise toward the toe-lasting means and having thereon shoe-supporting means which is raised by a treadle to engage the bottom of the forepart of the shoe with a holddown arranged to determine the relation of the bottom face of the toe end of the shoe to the plane of the wipers. To permit the shoe to assume a position determined by the holddown, shoe-supporting means in the construction shown comprises a toe rest mounted to tip with the shoe about axes extending respectively lengthwise and laterally of the shoe substantially at the bottom of its toe end in response to pressure of the holddown on the shoe, and a heel-end support movable with the toe rest about the laterally extending axis. The construction shown is further such that the shoe-supporting means may be turned with the shoe by the operator, or by pressure of the wipers on the sides of the toe, about an axis extending heightwise of the shoe, and the jack is locked in its operative position by means so formed as to permit such turning movement. To assist the operator in positioning the shoe properly on the jack there is also provided in the illustrated construction a toe-end gage which is withdrawn from operative position in response to the movement of the jack.

The above and other features of the invention, including novel means for supporting the shoe yieldingly to permit downward movement thereof relatively to the lasting means and for thereafter supporting it with greater force when the fastenings are driven, novel means for preventing the treadle, if held depressed, from interfering with return of the jack to starting position, novel means for clamping the upper to insure against displacement thereof when the wipers are partially retracted to permit the driving of the fastenings, and various novel details of construction and combinations of parts, will now be more particularly described with reference to the accompanying drawings and thereafter pointed out in the claims.

In the drawings,

Fig. 1 is a view of the machine in right-hand side elevation;

Fig. 2 is a perspective front view on an enlarged scale of a portion of the machine;

Fig. 3 is a perspective view of the holddown and parts associated therewith as viewed from below;

Fig. 5 is a plan view showing the holddown and one of the wipers and parts associated therewith;

Fig. 6 is a section on the line VI—VI of Fig. 5;

Fig. 7 is a view partly in side elevation and partly in section illustrating the relation of certain parts of the machine to a shoe prior to the lasting operation;

Fig. 8 is a section on the line VIII—VIII of Fig. 7 on an enlarged scale;

Fig. 9 is a view mainly in right-hand side elevation showing particularly portions of the mechanism for controlling the fastening-inserting devices;

Fig. 10 is a view in front elevation of a portion of the structure shown in Fig. 9;

Fig. 11 is a plan view of a portion of the means for controlling the fastening-inserting devices;

Fig. 12 is a plan view illustrating the relation of certain parts of the machine to a shoe at one stage in the operation of the machine;

Figs. 13 and 14 are respectively sectional and plan views illustrating the positions of certain parts of the machine at a later stage in the operation;

Figs. 15 and 16 are views similar respectively to Figs. 13 and 14, illustrating the positions of the parts at a still later stage in the operation;

Fig. 17 is a view partly in elevation and partly in section showing a portion of the shoe-supporting means and illustrating the positions of certain operating parts at the conclusion of the lasting operation;

Fig. 18 is mainly a plan view of parts shown in Fig. 17, on a larger scale, illustrating the positions of the parts also at the conclusion of the lasting opertaion;

Fig. 19 is a side view of the wiper-operating cam and parts associated therewith;

Fig. 20 is a section on the line XX—XX of Fig. 19;

Fig. 21 is a view mainly in vertical section of one of the fastening-inserting devices and parts associated therewith;

Fig. 22 is a view of the holddown in front elevation;

Fig. 23 is a view partly in right-hand side elevation and partly in section, showing a portion of the jack-controlling mechanism;

Fig. 24 is mainly a plan view illustrating the relation of the fastening-inserting devices and the wipers when the wipers are at the limit of their overwiping movement;

Fig. 25 is a view in rear elevation, on an enlarged scale, of portions of the structure shown in Fig. 4, illustrating also the relation of these parts to other parts shown in Fig. 9;

Fig. 26 is a view partly in left-hand side elevation and partly in section, illustrating the relation to the shoe-supporting means of a device which may be used to assist in the forming of the toe rest pad;

Fig. 27 is a view in left-hand side elevation of parts associated with the holddown;

Fig. 28 is a view in right-hand side elevation of modified controlling mechanism which may be associated with the fastening-inserting devices;

Fig. 29 is a plan view of a modified form of toe band; and

Figure 4:
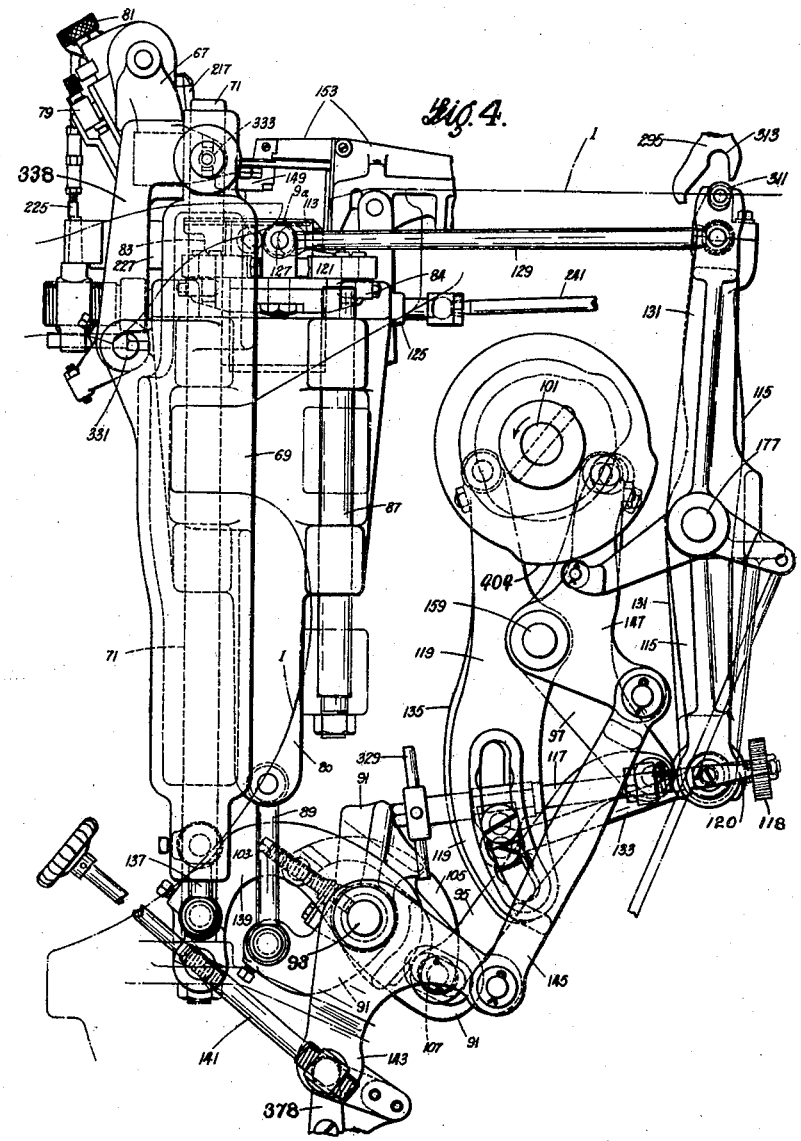
Fig. 4 shows in right-hand side elevation a portion of the mechanism for operating and controlling the wipers and the holddown.
Figure 30:
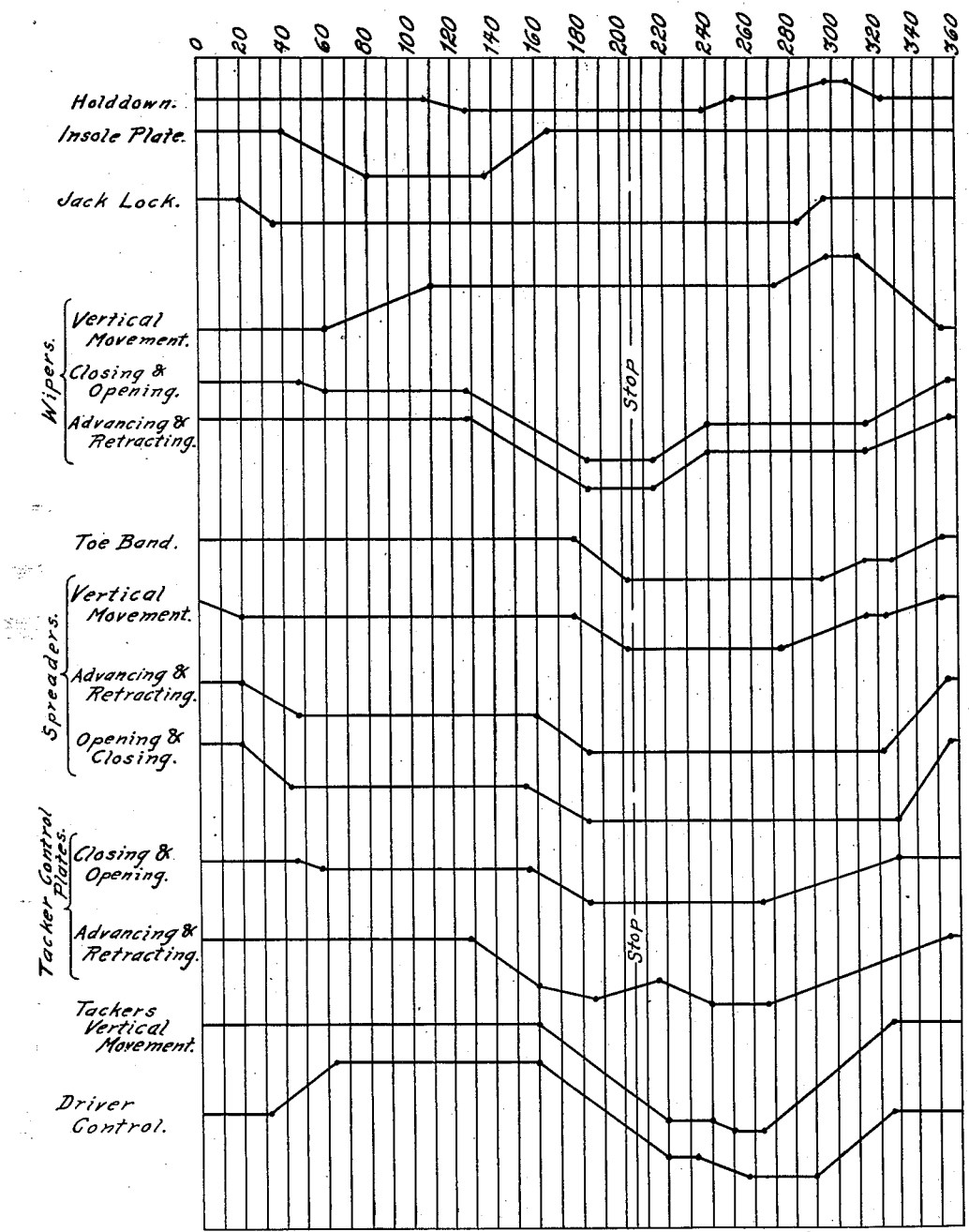
Fig. 30 is a chart illustrating the timing of the operations of different parts of the machine.

The machine has a base casting or frame 1 in the lower front portion of which is mounted a jack-carrying shaft 3 (Figs. 1 and 23). On this shaft is mounted a shoe support or jack comprising an upwardly extending casting 5 in which is slidably mounted a jack post 7 provided at its upper end with means hereinafter described for supporting a shoe bottom upward. The jack is arranged to be swung rearwardly (i. e., in a direction away from the operator) from an idle forwardly inclined position to a substantially vertical position to present the shoe to the lasting means with its toe end in predetermined relation to the meeting point 9ª (Fig. 2) of toe wipers 9. The jack post 7 is then elevated by depression of a treadle 11 to carry the bottom of the forepart of the shoe against a shoe-positioning device or holddown indicated generally at 13 in Figs. 3 and 7. By reason of the construction of shoe-supporting parts hereinafter described the shoe may tip at this time in response to pressure of the holddown on the bottom thereof so as to assume a position with the bottom of its toe end in substantially parallel relation to the plane of the wipers if not already in that relation. When the jack post is raised by the treadle, an upwardly extending tongue 15 (Figs. 2, 17 and 26), which is fast on the post and is curved concentrically with the axis of the post, is carried into similarly curved grooves formed in members 17 (Fig. 2) fast on the frame of the machine to lock the jack against either forward or rearward swinging movement. The members 15 and 17, however, permit the jack post and the shoe-supporting parts thereon to be turned with the shoe about the axis of the post in case the operator should wish to swing the heel end of the shoe to the left or the right to adjust the sides of the toe in better relation to the edges of the wipers or in case one of the wipers should bear harder than the other against the adjacent side of the toe in the upwiping operation.

For supporting the shoe on the jack post 7 there are provided both a toe rest and a heel-end support, these parts and the jack post constituting what may be termed a shoe holder. The toe rest comprises a rubber pad 19 (Figs. 2 and 17) so shaped as to conform substantially to the contour of the top of the toe end of the shoe over a comparatively large area. This pad is bonded to the upper surface of a metal block 20 positioned in a readily detachable manner by dowel pins on a second block 21 provided underneath with an arcuate guideway 23 curved laterally of the shoe about a virtual axis extending lengthwise of the shoe and located substantially on the bottom face of the toe end of the shoe. In order that this axis may always be located in that relation to the shoe, rubber pads 19 of different thicknesses, bonded to metal blocks 20 of uniform thickness, are provided for supporting shoes of different sizes, the manner of forming these pads being hereinafter explained. Preferably the different pads bear indications as to the sizes of shoes which they are intended to support. The curved guideway 23 in the block 21 cooperates with a similarly curved guideway on a member 25 supported substantially in line with the jack post on the rear end portion of a rocking frame 27. This frame has formed therein an arcuate guideway 29 curved about a virtual axis extending widthwise of the shoe and located substantially on the bottom face of the toe end of the shoe, this axis being spaced about an inch from the toe-end face of the shoe. The guideway 29 cooperates with a similarly curved guideway on a member 31 provided on the upper end of the jack post 7. It will thus be seen that when the shoe is raised to carry the bottom of its forepart against the holddown 13, as hereinbefore described, it is permitted to tip about axes extending lengthwise and laterally of the shoe substantially at the bottom of its toe end in response to pressure of the holddown thereon so that the bottom face of the toe will be located in proper relation to the plane of the wipers.

The rocking frame 27 also carries means for supporting the heel end of the shoe. For this purpose the frame has a pair of forwardly extending parallel bars 33 which are spaced far enough apart to provide room between them for the depending upper of a boot or shoe on the jack. A yoke 35 (Figs. 17 and 18) is slidingly mounted on the two bars 33 and is provided with a pivot pin 37 rotatable therein and parallel to the bars.

Fast on the rear end of the pivot pin 37 is a block 39 having secured therein a pair of parallel guide rods 41 extending laterally of the shoe. The block 39 is provided with a leather pad 40 arranged to engage the heel-end face of the shoe. Slidingly mounted on the two guide rods 41 at the opposite sides of the block 39 are members 43 having rearwardly projecting fingers 45 arranged to engage the sides of the heel end of the shoe in locations where the sides of the last curve inwardly toward the top of the last. The fingers 45 and the pad 40 thus provide a socket into which the downwardly tapering heel-end portion of the inverted shoe may be dropped as its toe portion is placed on the toe rest. The two fingers 45 may be adjusted toward or from each other to determine how high the heel end of the shoe is thus supported. For this purpose there is mounted in the block 39 a rotatable stem 47 held against axial movement relatively to the block and provided with right and left threads engaging corresponding threads in the members 43. The stem 47 may be turned to adjust the fingers 45 by means of a knurled head on one end thereof. For shoes of different lengths the yoke 35 may be adjusted along the bars 33, and for this purpose the bars are provided on their lower faces with rack teeth engaged by teeth formed on the opposite end portions of a shaft 49 rotatably mounted in bearings in the yoke. This shaft may be rotated by means of a disk 51 on one end thereof. It will be evident that by proper adjustment of the fingers 45 the heel end of a shoe of any particular style and size may be supported at such a height as to minimize any tipping of the shoe and its supporting parts about the axis of the guideway 29 when the shoe is raised against the holddown. It will also be understood that when adjustments of the fingers and of the yoke 35 have been made for a shoe of any particular style and size, no further adjustment will be necessary except for a shoe of a different style or size. To assist the operator in making any necessary adjustments, one of the members 43 carries a numbered scale 53 (Fig. 18) and the other member is provided with a cooperating index mark. The disk 51, moreover, has a numbered scale on its periphery cooperating with a pointer 55 on the yoke 35, this pointer being arranged also to engage teeth on the disk to hold the latter against rotation. To permit rotation of the disk when desired the shaft 49 is movable lengthwise against the resistance of a spring 57 to withdraw the teeth from engagement with the pointer. Conveniently the operator may be provided with a chart indicating the proper adjustments for shoes of different styles and sizes.

It will be understood that the toe rest block 20 with its rubber pad 19 may be conveniently removed from the block 21 by lifting it to permit another block 20 with a differently formed pad 19 to be substituted when shoes of a different style or size are to be operated upon. As previously stated, the pads 19 are made to vary in thickness in accordance with the varying thicknesses of the toe portions of different shoes, so that the virtual axes about which each shoe may tip in response to pressure of the holddown thereon will lie substantially at the bottom face of the toe end of the shoe. In forming a pad for a shoe of any particular style or size the rocking frame 27 may be moved along the guideway on the member 31, by lifting the forward end of the frame, until it occupies the same position relatively to the jack post 7 which it will occupy during the operation of the wipers on a shoe. This position is determined by a stop pin, hereinafter identified, which is inserted in a hole in the frame 27 in front of the jack post and is arranged to rest against the latter. There is secured, moreover, to the rocking frame a gage or jig member 34 (Fig. 26) provided with two surfaces 36 and 38 at right angles to each other, which occupy respectively the same positions relatively to the block 21 as the lower faces of the wipers and the meeting point of the edges of the wipers at the moment when the wipers begin to perform the overwiping operation. The jig member may conveniently be secured to the rocking frame 27 by the above-mentioned stop pin, which is indicated at 40, and a second pin 42 also inserted in holes in the jig member and in the frame. The surfaces 36 and 38 are formed on portions of the jig member which lie substantially midway between the opposite sides of the toe of the shoe. Having mounted on the block 21 a block 20 having thereon a pad 19 thicker than required, the operator inserts the toe portion of a previously lasted shoe of the style and size in question between the pad and the jig member and endeavors to force the toe-end face of the shoe against the surface 38 while its bottom face is engaging the surface 36. If the pad is too thick to permit this to be done, as it normally will be initially, the operator trims the pad in order to reduce it to the desired thickness while shaping it as nearly as possible to conform to the curvature of the top of the toe end of the shoe. After properly shaping the pad so that while it engages the shoe firmly the latter is positioned as determined by the surfaces 36 and 38, the operator may adjust the heel-end support in proper relation to the shoe and may note on a chart the indicated positions of the heel-end support as a whole and of its fingers 45. In the normal use of the machine the jig member 34 is, of course, removed and the rocking frame 27 is permitted to assume its normal idle position which is determined by engagement of a pin 59 (Fig. 17) therein with the front face of the jack post.

Mounted on the jack is a toe-end gage 61 (Fig. 1) which extends upwardly at the rear of the toe rest and is so positioned that after the jack has been swung rearwardly the front face of the gage lies directly beneath the meeting point 9ª of the wipers. The heel-end support may be so adjusted that the toe-end face of the shoe will actually contact with the gage 61 or will be spaced from the gage a predetermined small distance, depending upon whether it is desired that the wipers, in wiping the upper heightwise of the toe, shall bear with firm pressure or only moderate pressure against the end of the toe. In order that the gage may not interfere with the operation of the wipers and that of the toe band hereinafter referred to, there is provided means for moving it downwardly out of its operative position to a position well below the toe rest as the jack is swung rearwardly to carry the shoe toward the lasting means. For this purpose the lower end of the gage is connected to the rear end of a bell-crank lever 63 pivoted on the jack casting 5. A downwardly extending arm of this bell-crank lever is arranged, as the jack is swung rearwardly, to abut against a fixed web 65 on the machine frame, and by this means the bell-crank lever is swung to withdraw the gage. When the jack is swung forwardly the gage is returned to its operative position by a spring 64.

The holddown 13 is carried by a transversely extending crosshead 67 secured at its opposite sides, as hereinafter described, to a pair of vertical slides 69 mounted respectively on vertical rods 71 positioned near the opposite sides of the machine (Figs. 2, 4 and 5). A comparatively narrow insole-engaging foot 73 (Figs. 3 and 7) projects rearwardly from the crosshead about midway of the width of the latter. The lower face of this foot is arranged to engage the insole substantially midway between the opposite side edges of the insole and about an inch, for example, from the extreme toe end thereof. The narrow insole-engaging face of this foot is flat and lies in a horizontal plane. A pair of abutments 75, consisting of ribs about an inch and a half long and converging rearwardly toward each other are arranged to engage the insole near the opposite sides of its ball portion and are carried by a plate 77 mounted to rock on a forwardly and rearwardly extending rib 78 (Fig. 22) on the crosshead 67. This plate may be rocked about the rib 78 by turning movement of an adjusting member 79 which carries a pin 80 lying in a slot in an upstanding plate fast on the plate 77. The pin 80 is offset from the axis of a pin 82 about which the member 79 and a block 84 carrying this member are movable, and by adjustment of the member 79 relatively to the block 84 the position of the pin 80 may be varied to vary the amount of adjustment of the plate 77 resulting from the turning of the member 79. By such rocking movement of the plate 77 the two abutments 75 may be adjusted relatively to the foot 73 in accordance with the lateral curvatures of the bottoms of shoes of different styles at their ball portions in order to position their toe ends in the best relation to the plane of the wipers. The plate 77 may also be adjusted in directions heightwise of the shoe relatively to the foot 73 by an adjusting screw 81 held against axial movement relatively to the crosshead 67 and threaded in a block which carries the rib 78.

The toe wipers 9 are supported for upward movement to wipe the upper heightwise of the toe and also for advancing and closing movements lengthwise and laterally of the shoe to wipe the margin of the upper inwardly over the insole. For this purpose the wipers are respectively mounted on carriers 83 (Figs. 5 and 6) which are supported, through intermediate brackets 84, on a pair of castings 85 arranged to slide vertically on the vertical rods 71 and on other parallel fixed rods 87. The two castings 85 are connected at their lower ends by links 89 to bifurcated portions of a lever 91 mounted to rock about a transversely extending rod 93 and connected through a link 95 to another lever 97 operated by a cam on a cam shaft 101. It will be seen that by this means the wipers are raised and lowered. In order that the amount of upward movement imparted to the wipers may be varied in accordance, for example, with variations in thickness of upper materials, the link 95 may be adjusted along the lever 91, toward or from the axis of the lever, by means of a threaded stem 103 which is held against axial movement in the lever 91 and has threaded connection with a curved link 105 connected to a pin 107 extending through a slot in the lever and to which the link 95 is connected.

The wiper carriers 83 consist of plates on which the wipers are secured in a readily detachable manner by means of spring-pressed studs 109 (Figs. 5 and 6). On the outer edges of these plates are arcuate faces 111 curved about the meeting point 9ᵃ of the edges of the wipers, and in the closing movements of the wipers about this meeting point these faces are engaged by guiding means hereinafter described. Each of the carriers 83 has connected to it by a ball joint the forward end of a rearwardly extending rod 113, the two rods being connected at their rear ends, also by ball joints, to upwardly extending arms of a lever 115 (Figs. 4 and 25) which is connected through a rod 117 to a lever 119 operated by a cam on the shaft 101. The forward end of the rod 117 may be adjusted along a slot in the lever 119 to vary the amount of wiper-closing movement imparted to the wiper carriers.

For guiding the wiper carriers 83 in their wiper-closing movements the arcuate faces 111 on the carriers are engaged by correspondingly curved faces on blocks 121 mounted to turn freely about vertical studs 123, these studs having eccentric portions for adjusting the blocks. Each wiper carrier is thus guided by a pair of blocks 121 positioned one behind the other. The four blocks 121 are carried by the brackets 84 which are mounted for sliding movements in directions lengthwise of the shoe. For this purpose the brackets 84 have secured in them forwardly and rearwardly extending hollow stems 125, one at each side of the shoe, these stems being slidingly mounted in bores in the castings 85. The two brackets 84 have pivoted to them at 127 the forward ends of a pair of rods 129 the rear ends of which are pivoted to upwardly extending arms of a lever 131 (Figs. 4 and 25) operated, through a link 133 and a lever 135, by a cam on the shaft 101. To vary the amount of advancing movement imparted to the wipers the link 133 may be adjusted along a slot in the lever 135.

After the wipers have arrived at the end of their upwiping movement, the holddown 13 is moved a short distance downwardly to move the shoe downward relatively to the wipers prior to the movement of the latter to wipe the margin of the upper inwardly over the shoe bottom. For this purpose the vertically movable slides 69 are connected at their lower ends (Fig. 4) by short links 137 to forwardly extending arms of a lever 139 (see Fig. 25) mounted to swing about the rod 93. This lever is connected, through an adjustable threaded rod 141, to a lever 143 also mounted on the rod 93 and connected by a link 145 to a lever 147 operated by a cam on the shaft 101. It will be understood that by turning movement of the rod 141, which is threaded in blocks swiveled in the levers 139 and 143, the position of the holddown heightwise of the shoe may be varied.

To insure that the upper will be shaped tightly over the toe end of the last and that its margin will be wiped inwardly over the insole without objectionable pleats or wrinkles, the machine is provided with means for spreading the margin of the upper outwardly over the wipers and for clamping it on the wipers for better control thereof in the wiping operation. This upper-spreading means comprises a pair of fingers 149 arranged to swing about vertical axes located close together approximately at the end of the toe of the shoe and movable also bodily lengthwise of the shoe. The fingers thus swing about pivot pins 151 and initially occupy positions close against the opposite sides of the holddown foot 73 and well above the insole, as indicated in Figs. 7 and 12. These fingers may be, for example, about an inch and a half in length and the pins 151 may be spaced about half an inch apart, the portions of the fingers which surround the pins being arranged approximately in contact with each other. The pins 151 project downwardly from a member 152 mounted on the forward end of a bar 153 (Fig. 7). The rear end of this bar is pivotally connected by a pin 155 to the upper end of a lever 157 mounted on a fixed rod 159 at its lower end and provided with a roll 161 engaged by a cam on the shaft 101. The member 152 has an arcuate upper surface 163 (Fig. 8) which abuts against a corresponding surface on the bar 153 so that the member 152 and the fingers 149 may rock as a unit about an axis extending lengthwise of the shoe to permit the fingers to bear with uniform pressure on the different portions of the upper which they engage. Tongue and groove portions of the member 152 and the bar 153 maintain the member in correct relation to the bar vertically, and a screw 165 threaded in the bar extends into a slot in the member 152 to hold the parts in assembled relation and to limit the amount of rocking movement of the member 152.

Somewhat forwardly of its rear end the bar 153 is connected by a horizontal pivot pin 167 to the upper ends of a pair of substantially vertical links 169 the lower ends of which are connected by a short link 171 having an upstanding bifurcated portion 173 to the forward end of a lever 175 mounted at its rear end on a pin 177 and carrying a roll 179 engaged by a cam on the cam shaft 101. The forward end of a comparatively strong spring 181 bears against the upstanding portion 173 of the link 171 and is adjustable along the link, the rear end of this spring abutting against a shoulder on a rod 183 extending through the spring and pivoted on the lever 175, so that the spring provides yielding means whereby downward swinging movement of the lever 175 imparts downward movement to the spreading fingers 149. An adjustable stop screw 184 threaded in the lever 175 beneath the link 171 provides an abutment against which the link is normally pressed by the spring 181.

The lever 157 provides means whereby the fingers 149 are moved rearwardly lengthwise of the shoe as they are swung outwardly away from each other and whereby they are also moved farther rearwardly toward an inoperative position to carry them out of the way of fastening-inserting mechanism hereinafter described. For swinging the fingers about their pivots 151 to spread the margin of the upper, each finger has pivoted in it by a ball connection a stud 185 (Figs. 2, 5 and 7) on which is secured the forward end of a rearwardly extending link 187. The two links are connected at their rear ends by substantially vertical pivots 189 to a rack 191 slidable forwardly and rearwardly in a slideway in the bar 153. A pinion 193 engages teeth on the lower side of this rack, this pinion being mounted to turn on the previously mentioned pin 167. The pinion is engaged by an arcuate toothed sector 195 formed on an upwardly extending arm of a short lever 197 mounted to swing about a pin 199 which is secured in an arm 201 depending from the bar 153. The lever 197 has a rearwardly extending arm 203 which carries a roll arranged to be engaged by the periphery of one of the cams on the cam shaft 101 and to be operated thereby in the overwiping operation of the wipers to cause the fingers 149 to swing apart to their maximum extent. A second lever 205, also connected to the toothed sector 195, and pivoted on the pin 199 at one side of the lever 197, carries a roll arranged to be engaged by the periphery of another of the cams and to be operated thereby, prior to the operation of the arm 203 by its cam and prior to the upwiping movement of the wipers, to cause the fingers to swing apart to a limited extent to positions in which they spread the margin of the upper outwardly a little beyond the edge of the insole. In order that the amount of this swinging movement of the fingers may be varied, to insure that the fingers will act in the desired manner on shoes which differ substantially in the width or curvature of their toe ends, the lever 205 carries, on a short arm extending forwardly of its pivot pin, a trunnion through which passes a stem 207 threaded at its rear end in a second trunnion mounted on the lever 197. By rotating this stem the lever 205 may be angularly adjusted about its pivot pin to raise or lower its cam roll and thereby to vary the amount of movement which will be imparted to it as a high portion of its operating cam passes beneath the roll. A web 209 on the lever 197 has a short slot 211 formed therein along which a pin 213 on the lever 205 is moved as this lever is adjusted, this slot cooperating with the pin to limit the amount of adjustment of the lever 205.

It is desirable that the toe-end portion of the insole be held firmly against the bottom of the last in the upwiping operation of the wipers and at the beginning of their overwiping movement, in order to insure against displacement of the margin of the insole. For this purpose the crosshead 67 which carries the holddown 13 has pivoted on it at 214 (Fig. 7) an arm 215 carrying an insole-engaging plate 217 which is swung downwardly into engagement with the insole by an arm 219 having a roll lying in a curved slot 221 in the arm 215. The arm 219 is fast on a transverse shaft 223 rotatable in the crosshead 67, and also fast on this shaft is an arm 224 (Fig. 27) operated through a link 225, and other connections hereinafter described, by a cam on the cam shaft 101. The arm 215 carrying the plate 217 is bifurcated to straddle the insole-engaging foot 73 of the holddown, and the plate, which is substantially D-shaped in plan, is arranged to engage the insole rearwardly of the foot 73, as shown in Fig. 14, and to extend toward the end of the toe while leaving sufficient space between it and the end of the toe for the margin of the upper to begin to be laid over the insole.

After the wipers have wiped the margin of the upper inwardly over the insole they are partially retracted from their fully advanced and closed positions prior to the driving of the fastenings, and in order to insure against displacement of the upper by such retractive movement of the wipers the machine is provided with means for clamping the upper about the toe exteriorly of the shoe bottom. This means comprises a flexible band 227 (Figs. 2 and 5) of thin strip steel, preferably about an inch in width, arranged to extend around the forepart of the shoe from near the waist portion at one side to a similar position at the other side. The opposite ends of this band are provided with vertical tubular portions mounted on pins 229 which extend upwardly from members 231 carried by the forward ends of a pair of parallel rearwardly extending rods 233. These rods are slidingly mounted in the previously mentioned hollow stems 125 in the castings 85 supporting the wiper carriers, and threaded in the members 231 are sleeves 235 portions of which surround the stems 125 and by the turning of which the members 231 may be adjusted in directions lengthwise of the shoe. The forward portions of the rods 233 are reduced in diameter, and springs 237 mounted between shoulders at the rear ends of the reduced portions and at the forward ends of the threaded sleeves 235 normally urge the latter forwardly into contact with nuts 239 on the forward ends of the rods and provide means through which the band is applied yieldingly against the shoe by forward movement of the rods. The rods 233 at their rear ends are coupled by ball joints to the forward ends of rearwardly extending rods 241 which are connected (Fig. 7) by socket members 242 to the upper ends of arms 243 extending upwardly from the previously mentioned lever 175 which lowers the spreading fingers 149. Accordingly, forward movement of the arms 243 serves to apply the band to the shoe. In order that the fingers 149 may be moved down toward the insole early in the cycle of operations of the machine without affecting the position of the band 227, there are pin-and-slot connections 244 between the rods 241 and the socket members 242 permitting limited movement of these members relatively to the rods.

The means for driving fastenings to fasten the upper in lasted position is supported by a stationary head casting 245 bolted on the upper face of the casting 1. The casting 245 has formed in its front face a vertical guideway for a tubular slide 247 which is connected by a pair of links 249 (Figs. 1, 2 and 9) to a forwardly extending bifurcated portion of a lever 251 movable about a transverse shaft 327 by a cam mounted on a second cam shaft 253 located above the main cam shaft 101 and driven by the latter through suitable gearing. Secured to the lower end of the slide 247 is a flange member 255 which is substantially D-shaped when viewed from above, the straight side of the member being at the front. Suspended about the curved opposite sides and rear of this D-shaped member, in the manner illustrated in Figs. 2 and 21, is a gang of fastening-inserting devices or tackers comprising arms 257. Each of these arms consists of a plate lying in a substantially vertical plane which extends substantially at right angles to the adjacent part of the curved periphery of the member 255. It will be evident that the several arms are movable downwardly and upwardly with the tubular member 247 and are also so suspended that their lower ends may be swung in inward or outward directions over the shoe bottom. Each tacker arm is formed at its lower end to provide a tack nozzle with a tack passage therein arranged to receive a tack at a certain time in the operation of the machine through a flexible tube 259 from one or the other of two tack-separating devices 261 (Fig. 1) of known type associated with oscillatory tack pots 263 on the head casting. A leaf spring 262 (Fig. 21) is arranged to extend normally into the tack passage in the nozzle to retain the tack before it is driven. Movable upwardly and downwardly along a slideway on each tacker arm 257 is a carrier 265 for a tack driver 266 in the tack passage. The gang of drivers is connected to and arranged to be operated by a single bar 267 mounted for vertical sliding movement in the tubular slide 247 and having at its lower end a D-shaped head 268 against the upper and lower faces of which lugs projecting from the carriers 265 abut. It will thus be seen that the several tacker arms may be swung in inward or outward directions relatively to the head 268 while the drivers remain connected to the bar 267.

Springs 269 (Fig. 10) mounted within the tubular slide 247 are arranged at a certain time to impart rapid downward movement to the bar 267 to operate the tack drivers. The bar 267 is operatively coupled normally at its upper end to a crosshead 270 which is connected by a pair of links 271 to a bifurcated portion of a forwardly extending lever 273 mounted on a shaft 274 in the head casting and provided with a cam roll arranged to be operated by a cam on the shaft 253. Accordingly, by movement of the lever 273 the crosshead 270 and the bar 267 connected therewith are raised against the resistance of the springs 269 to retract the tack drivers and to compress the springs preparatory to the tack-driving operation. The coupling between the bar 267 and the crosshead 270 comprises a member 275 movable forwardly and rearwardly on guide rolls 276 on the crosshead. A spring 277 normally urges this member forwardly and causes a beveled face 278 thereon to engage a roll 279 on the bar 267. A latch 280 pivoted on the member 275 has a hooked forward end which normally engages a plate 282 fast on the bar 267 and thereby prevents rearward movement of the member 275. The bar 267 is accordingly raised by the upward movement of the crosshead and it is held in raised position, with the springs 269 under compression, until the tacks are to be driven into a shoe. Substantially at the end of downward movement of the slide 247 to carry the tackers toward the shoe bottom, the latch 280 is engaged and operated by a latch-tripping member 281 supported as hereinafter described, so that the member 275 is released to permit it to be forced rearwardly by the roll 279 as the bar 267 is impelled downwardly by the springs 269. Prior to their downward movement the tackers are maintained high enough above the wipers to permit the operative movements of the spreading fingers 149 over the wipers, and it is only after these fingers have been carried away from over the wipers that the full downward movement of the tackers takes place.

It is desirable that the tacks be driven at substantially uniform distances from the edge of the shoe bottom, and to insure this result the tacker arms 257 are further controlled by means which swings them inwardly to bring the nozzles at their lower ends into positions which are slightly beyond but close to the edges of the wipers when the latter are partially retracted to uncover a portion of the margin of the upper to receive the tacks. This means comprises a pair of plates 283 (Figs. 2, 9 and 11) having therein slots 285 curved similarly to the wiping edges of the wipers. These plates are normally spaced a substantial distance above the wipers and are advanced and closed in paths similar to the paths of movement of the wipers. The tacker nozzles at the lower ends of the arms 257 are confined within the slots 285 and are thereby maintained in a group formation appropriate for the purpose in view, the several nozzles being held yieldingly against the outer edges of the slots by springs 287 connected to the tacker arms and tending to swing them outwardly. The plates 283 are supported in a readily detachable manner on a table 289 which is supported at each side by a pair of depending parallel links 291 pivoted at their lower ends to the table. One of the two links 291 at each side is pivotally connected at its upper end to the slide 247 and the other link is pivotally connected at its upper end to the lower end of the link 249. It will thus be seen that the table 289 moves upwardly and downwardly with the tacker arms and is also movable in directions lengthwise of the shoe.

The plates 283, like the wipers, are opened or closed laterally of the shoe as they are moved bodily lengthwise of the shoe by the table 289. For this purpose the plates are secured on carriers 290 each of which is provided with a pair of cam slots 292, and in these cam slots are rolls 294 freely rotatable on pins extending upwardly from the table 289. Accordingly the rolls and cam slots determine the paths of closing movements of the plates. The carriers 290 have connected to them by ball joints the forward ends of links 293 which are connected at their rear ends to depending levers 295 (Figs. 9 and 25). The levers 295 are mounted to swing at their upper ends about a rod 317 in the head casting and are arranged to be connected at their lower ends, as more particularly hereinafter described, to the upper ends of the upwardly extending arms of the lever 115 which imparts to the wipers their closing movements. The table 289 which supports the carriers 290 is coupled to the forward ends of links 297 which are connected at their rear ends to two depending levers 296 mounted on the rod 317, the lower ends of these levers being rounded and lying in slots formed in the upper ends of the upwardly extending arms of the lever 131 which imparts advancing movement lengthwise of the shoe to the wipers. It will thus be seen that advancing and closing movements are imparted to the plates 283 by the same means which impart corresponding movements to the wipers. In order, however, to insure that the margin of the upper beyond the edges of the wipers will be laid properly upon the insole before the tacks are driven, the plates 283 are further operated in such manner that the tacker arms are moved lengthwise of the shoe relatively to the wipers before they arrive in tacking positions, so that their tack nozzles are carried inwardly across the edges of the wipers and will therefore lay inwardly over the insole any portion of the margin of the upper which may possibly overlie the wiper edges. For this purpose each link 293 and 297 is made in two parts the adjacent ends of which are pivotally connected to a small sleeve 299 (Fig. 9) so that the two parts of the link may, in effect, serve as a toggle. Each sleeve 299 is slidingly mounted on a short stem 301, the four stems projecting forwardly from a bar 303 carried by the forward end of a lever 305 which is mounted to swing about a rod 307. This lever has an upwardly extending arm carrying a roll 309 which lies in a cam track formed in a cam on the shaft 253. The four toggle devices thus provided are normally broken slightly in an upward direction (Fig. 9), so that the tacker arms are held by the plates 283 in somewhat retracted positions relatively to the edges of the wipers, and they are further broken to retract the arms still more lengthwise of the shoe relatively to the wipers as the arms are moved downwardly to bring their lower ends close to the top faces of the wipers (Fig. 24) whereupon the lever 305 is swung downwardly by its cam to straighten the toggles and thus to impart such further advancing movements to the plates 283 as to carry the tacker nozzles across the edges of the wipers as the wipers are partially retracted (Fig. 18). The tacker arms are then further lowered sufficiently to cause the nozzles to press the margin of the upper upon the insole. Since the toggle devices are all of the same length and receive equal movements, no swinging of the tacker arms laterally of the shoe results from the breaking or straightening of these devices.

In order to avoid any possibility that the plates 283 might strike against the foot 73 of the holddown in operating on shoes having very narrow toes, the construction is further such that the levers 295 for imparting the closing movements to the plates 283 are not connected to the wiper-closing lever 115 until after the wipers have closed part way inward over the shoe bottom. For this purpose the two upwardly extending arms of the lever 115 (Figs. 4 and 25) carry rolls 311, and to receive these rolls the lower ends of the levers 295 are provided with notches 313 the lower portions of which are considerably wider than the upper portions. Initially the levers 295 are held in raised positions so that the rolls 311 do not begin to act thereon until after the wipers have moved about half way toward their fully closed positions. At this time, moreover, the rolls engage the levers in the lower wide portions of the notches 313, and accordingly as the wipers are further closed by the lever 115 the plates 283 hold the tacker arms considerably retracted laterally of the shoe from the edges of the wipers. After arriving at their fully closed positions, the wipers, as previously stated, are partially retracted, at which time the lever 115 receives a reverse movement without imparting any reverse movement to the levers 295 by reason of the widths of the lower ends of the notches 313. The levers 295 are lowered to cause the rolls 311 to enter the narrow upper portions of the notches 313 only at the time when the toggle devices provided by the links 293, 297 are straightened as hereinabove described. To permit the downward movement of the levers 295 the upper end of each lever has a slot 315 therein through which the rod 317 extends. Near its lower end each lever is connected at 319 to the lower end of a link 321 which is pivotally connected at its upper end by a pin 320 to another link 323, this link being pivotally connected at its lower end to the lever 305 whereby the toggle devices are straightened as described. Accordingly, the downward movement of the lever 305 serves not only to straighten the toggle devices but also to move the levers 295 downward for the purpose above explained. In order to guide the pin 320 properly during the downward and upward movements of the lever 295, a link 325 is connected at one end to this pin and at the other end to the shaft 327 on which the lever 251 is mounted.

The machine is further provided with means for adjusting the wipers 9 toward or from each other to position them better for operating on shoes which differ somewhat in size or shape. For this purpose the rod 117 (Fig. 4) which connects the wiper-operating lever 115 to its operating lever 119 is threaded in a trunnion in the lower end of the lever 115 and has a hand wheel 329 on its forward end within easy reach of the operator for turning it. It will be understood that by turning this rod the lever 115 is adjusted relatively to the lever 119 to swing the wipers toward or from each other about the axis of their closing movement. To prevent unintentional rotation of the rod 117 during the operation of the machine, there is provided on the rear end of the rod a notched disk 118 engaged on its notched periphery by the rear end of a leaf spring 120 secured to the trunnion in which the rod is threaded. This permits the rod to be turned at any time by the operator but insures against accidental turning thereof at any other time.

To assist the operator in determining the proper adjustment of the wipers for any particular size or style of shoe, the machine is also provided with a fixed indicator scale 330 (Fig. 1) having graduated numerals thereon, and an index finger 332 arranged to travel along the scale as the wipers are adjusted by the operator. The indicator scale is an arcuate one, and the index finger is carried by one arm of a bell-crank lever 334 (Fig. 25) the other arm of which is connected to a slidable rod 336 arranged to be moved forwardly or rearwardly by the lever 115 in the adjustment of the wipers. Conveniently the numerals on the indicator scale are tabulated on the previously mentioned chart so that the operator may know where to set the wipers for shoes of different sizes or styles.

For operating on shoes which differ greatly in size or style it is preferable to use different wipers of corresponding sizes and shapes, and to facilitate the substitution of one pair of wipers for another, the wipers, as previously described, are mounted on their carriers in a readily detachable manner. In order to afford ample room for the substitution of different wipers, the crosshead 67 carrying the holddown is connected at its opposite ends by depending arms 338 thereon with a pair of coaxial pivot pins 331 (Figs. 1, 4, 5 and 27) on the slides 69 which are so positioned that by swinging the crosshead forwardly and downwardly from a normal upright position in which it is yieldingly retained by spring pins 333, the crosshead and the parts supported thereon are moved completely away from the wipers to afford better access to the wipers. The rod 225 (Fig. 27) which is connected to the insole-engaging plate 217 as previously described, is pivotally connected at its lower end to a forwardly extending arm of a bell-crank lever 340 arranged to swing about a pivot pin 350 secured in the left-hand arm 338. A downwardly extending arm of this bell-crank lever carries a pin 342 which is arranged, when the parts of the machine are in their starting positions, to occupy a position coaxial with the pins 331. Connected to the pin 342 is the forward end of a cam-operated rod 344 whereby the lever 340 is operated to swing the insole-engaging plate 217 toward or from the shoe.

It will thus be seen that since the pin 342 is coaxial with the pins 331 when the parts are in starting positions, the crosshead 67 may be swung about the pins 331 without affecting the position of the rod 344. There is further provided, however, means for disconnecting the rod 344 from the bell-crank lever 340 when the crosshead 67 is thus swung downwardly, to insure against any damage to the machine if it should be accidentally started with the crosshead in its lowered position. For this purpose the rod 344 is provided with an L-shaped slot in a vertical portion of which the pin 342 normally lies, as shown in Fig. 27, but in the horizontal portion of which the pin lies when the crosshead is in its lowered position. As the crosshead is thus lowered, a pin 346 underlying the rod 344 and secured in an extension of the downwardly extending arm of the bell-crank lever 340, is arranged to lift the rod 344 until the pin 342 lies in the horizontal portion of the slot. If the rod 344 should then be moved rearwardly, it will not operate the lever 340. A leaf spring 348 secured to the left-hand arm 338 serves to urge the rod 344 downwardly and thus to maintain it normally with the pin 342 in the vertical portion of the slot.

When the upper materials of different shoes differ substantially in weight and in their ability to withstand without damage pressure of the edges of the wipers against them in the upwiping operation, or when the side faces of the toe portions of different lasts differ substantially in heightwise curvature, it may be desirable to alter in view of such differences the character of the pressure applied by the wipers to the upper. For this purpose the previously mentioned wiper-closing cam, shown at 337 in Figs. 19 and 20, has the portion 339 of its cam face, which determines the positions of the wipers widthwise of the toe in the upwiping operation, formed on a portion of the cam which is separate from the remainder of the cam instead of being integral with it. This portion of the cam comprises a curved plate 341 which is pivoted at one end at 343 to the remainder of the cam and is connected near its other end by a pin 345 to a block 347 carried by the cam and extending radially of the cam shaft. In the outer end of this block is threaded the inner end of a radial rod 349 the outer end of which is provided with a head having a screw driver slot therein. This head fits within a recess formed in a small crosshead 351 carried by the cam. Four springs 353 mounted in recesses in the cam tend to urge the crosshead 351 outwardly and hold it normally against a stop 363 on the cam with the plate 341 in a position in which its cam face 339 occupies the same relation to the rest of the cam face as it would if the plate were integral with the remainder of the cam. The plate 341 is thus controlled yieldingly instead of positively, and accordingly if the wipers should find difficulty in the upwiping operation in passing any outwardly bulging portions of the side faces of the toe end of the last, the wedging action of the shoe on the wipers will force them apart, against the resistance of the springs 353, the plate 341 swinging inwardly about its pivot 343. This insures that the wipers will not apply excessive pressure to the upper. After the wipers pass the most prominent parts of the bulging portions of the sides of the toe, the springs 353 force the plate 341 outwardly again to hold the wipers against the sides of the upper with adequate pressure as they approach more closely the edge of the shoe bottom.

It is contemplated that the use of such a yielding cam plate will be beneficial in operating on shoes the upper materials of which are of average weight. In operating, however, on shoes having uppers of comparatively light weight, it may be preferable so to adjust the wipers that they will apply only a comparatively light pressure to the upper at the widest part of the toe portion and to lock the yielding cam plate 341 against yielding inwardly from its normal outermost position so that the wipers will be positively controlled. Under these conditions the upper-spreading fingers 149 which clamp the upper upon the wipers prior to the completion of the upwiping operation may, with the wipers, be relied upon to tension the upper sufficiently heightwise of the last without the necessity for maintaining effective upwiping pressure of the wipers on the upper all the way to the edge of the shoe bottom. For thus locking the plate 341 against inward movement there is arranged in the cam, in substantially perpendicular relation to the stem 349, a rod 357 which may be moved inwardly to carry its inner end into a groove 359 in the inner face of the block 347, thus preventing any inward yield of the plate 341. The rod 357 is threaded in the cam and has a screw driver slot formed in a head at its outer end for turning it. A block 361 secured to the cam serves as a stop to limit outward movement of the rod 357. It will be understood that when the rod is in its outer position it does not interfere with the yielding movement of the plate 341.

It may further be desirable, as in operating on shoes the uppers of which are of relatively heavy weight, that the wipers bear unyieldingly against the opposite sides of the toe in the upwiping operation and that near the end of this operation they be closed somewhat farther inwardly to press more firmly against the upper on portions of the sides of the last which slope inwardly toward its bottom face. For this purpose the cam plate 341 may be moved by the stem 349 so far inwardly that its cam face 339 is shrouded by a positively acting cam face 360 (Fig. 20) formed on a portion of the cam at the side of the plate 341. When the stem 349 is turned in the appropriate direction for the purpose in view, the head of the stem abuts against the stop 363 so that rotation of the stem serves to force the plate 341 inwardly. The portion of the positively acting cam face 360 which controls the wipers during substantially the first three-fourths of the upwiping operation is formed concentrically about the axis of the cam, but that portion of the face which controls the wipers near the end of the upwiping operation, indicated at 365 in Fig. 19, is so formed as to impart a closing movement to the wipers before they arrive at the edge of the shoe bottom. This causes the wipers to press more firmly against the upper than they otherwise would on portions of the sides of the toe which slope inwardly toward the edge of the shoe bottom. It will be understood that under these conditions the wipers will have been adjusted by the operator so that they are sufficiently wide apart to permit them to pass the widest part of the toe without excessive pressure on the upper.

Instead of the toe band previously described for clamping the upper around the toe end of the shoe, there may be used a construction such as shown in Fig. 29. In this construction there is pivotally mounted on each of the pins 229 a small bracket 230 provided with two short vertical pins 228, and on each of these pins is pivotally mounted a lug 232 to which is secured one end of a flexible steel band 234 similar to the previously described band 227. Two bands 234 are accordingly provided, one lying within the other. Between these two bands and secured to portions of the inner band which will press against the upper in locations at or near the ends of the toe tip line, are a pair of substantially rectangular metal blocks 236 of approximately half the height of the band. These blocks may be, for example, about a quarter of an inch in thickness and three-quarters of an inch in length. Secured to the outer band below the blocks 236 are a pair of similar blocks 238 on which the blocks 236 are supported. The blocks 236 and 238 thus hold the two bands apart at the sides of the toe, but permit them to engage each other at the end of the toe. It will be understood that in operating on the shoe the pressure of the outer band is applied to the inner band through the blocks 236 and 238 to insure adequate pressure at the sides of the toe. A tongue 240 projects horizontally in a rearward direction from the lower portion of the outer band to lie in a guideway in a member which moves upwardly and downwardly with the wipers, to assist in guiding the bands when they are applied to the shoe. Near their forward ends the two bands are connected together by springs 246 which tend to pull the outer band forwardly and inwardly toward the inner band to increase the pressure of the latter on the shoe in the vicinity of the toe tip line.

The mechanism for controlling the jack post 7 is shown particularly in Fig. 23. The lower end of the jack post abuts against the upper end of a rack bar 369 (see Fig. 1) which is movable upwardly and downwardly in the jack casting 5, and to the lower end of the rack bar is connected the forward end of a lever 371 mounted on a transverse shaft 373 fixed in the jack casting. Near its rear end the lever 371 carries a roll 375. Prior to the starting of the power operation of the machine a link 377, pivotally connected at its lower end to the treadle 11, presents over the roll 375 a shoulder which acts on the roll in the depression of the treadle to swing the lever 371 in the direction to raise the jack post and carry the bottom of the shoe against the holddown 13, the link also tending to swing the jack rearwardly. Shortly after the beginning of the power operation, i. e., when the holddown is moved downward prior to the overwiping operation of the wipers, a treadle-releasing lever 378, which forms an extension of the holddown-operating lever 143 (Fig. 4), is swung in a direction to strike the upper end of the link 377 and move the link away from over the roll 375 against the resistance of a spring 379 (Fig. 1) which holds the link normally in operative position. This insures that even if the operator should still be holding the treadle in depressed position when the wipers finally descend to their initial positions after operating on the shoe, he will not be able to prevent downward movement of the jack post and forward swinging movement of the jack. Accordingly, there is no danger of any downward wiping action of the wipers on the upper as they descend to their initial positions.

In order to control the jack post when it is released from the treadle as above described, there is freely rotatable on the shaft 3 (Fig. 23) a pinion 380 engaging the rack bar 369. A ratchet wheel 402 is formed integral with this pinion, and there is also freely rotatable on the shaft 3 a pawl-carrying plate 382 having three pawls 381 pivoted thereon, these pawls being so arranged that one or another of them will be substantially in position to prevent any reverse movement of the ratchet wheel when the pawls are moved toward the wheel. Pivotally connected to the front of the pawl-carrying plate 382 is a downwardly and forwardly extending rod 384 surrounded by a tubular casing 383, the rod having on its forward end a nut 386 bearing against one end of a comparatively strong spring 388 inside the casing. The other end of the spring 388 bears against a member 392 threaded in the rear end of the casing 383. A collar 385 threaded on the forward end of the casing serves as an abutment for one end of a comparatively light spring 387, the other end of this spring bearing on a plate 390 secured to a trunnion mounted in the base of the machine and through which the rod 384 extends. The member 392 is so spaced from the plate 390 that the depression of the shoe and the jack post 7 which occurs immediately prior to the overwiping operation of the wipers is resisted only by the light spring 387, but any tendency thereafter for further downward movement of the shoe is further resisted by the stronger spring 388 in addition to the spring 387 by reason of engagement of the member 392 with the plate 390. Insurance is thus afforded that the shoe will be firmly supported at the time when the upper-fastening tacks are driven.

Projecting laterally from tail portions of the pawls 381 are pins two of which lie in slots 394 formed in a pawl-controlling plate 389 mounted to turn freely on the shaft 3. Spring plungers, only one of which is shown, act on these pins to force the pawls against the ratchet wheel 402 when the plate 389 is moved in a counterclockwise direction. The third pawl is controlled by a spring 396 connected to a hook thereon, this spring holding the pawl normally in a position determined by engagement of the pin on its tail portion with an end face of the controlling plate 389 and forcing the pawl yieldingly against the ratchet wheel when this plate is turned in the above-mentioned direction. A spring 398 connected to the plate 389 tends to move the plate in the counterclockwise direction to cause the pawls to engage the ratchet wheel. Initially, however, the plate is held in such a position that the pawls do not engage the ratchet wheel by means of a lever 500 controlled by a cam 404 (Fig. 4) on the cam shaft 101. When the shoe has been raised into engagement with the holddown by depression of the treadle and the machine is thereafter started, the lever 500 is moved in a direction to permit the pawls to engage the ratchet wheel and thus to connect the jack post 7 with the rod 384 and its controlling springs, so that the jack post is supported independently of the treadle. Substantially at the end of the cycle of operations of the machine, when the holddown has been lifted and the spring 387 is substantially relieved of compression, the lever 500 is moved in the direction to withdraw the pawls from engagement with the ratchet wheel to permit the lowering of the jack post.

The machine is driven through a suitable clutch and is controlled by starting and stopping mechanism which is not shown in detail but may be of any well-known construction adapted for the purposes in view, the construction being such that the machine is brought to a stop automatically immediately after the wipers have performed their overwiping operation and before the tacking mechanism is operated to drive the tacks. The operator is thus enabled to inspect the shoe as well as he may before the upper is fastened in lasted position, and in case he should not be satisfied with the condition of the work, the machine is further provided with means whereby the tacking mechanism may be prevented from driving tacks when the machine is again started to complete its cycle. This means comprises a pivoted hand lever 391 (Fig. 1) which is connected by a rod 393 to a lever 395 on which the previously mentioned latch-tripping member 281 (Fig. 9) is secured, the lever 395 being mounted on gibs 397 (Figs. 1 and 10) which assist in guiding the slide 247. By swinging the hand lever upwardly when the machine is at rest at the end of the first stage of its cycle, the operator may move the member 281 forwardly to such a position that the latch 280 can pass by it without releasing the tack drivers, so that no tacks will be driven as the machine completes its cycle. Preferably the machine is provided with a pair of oscillatory tack pots 263 containing tacks of different lengths and with tack separators 261 controlled in a well-known manner by the tack pots, one or the other of the separators acting in the first stage of the cycle to separate and deliver tacks to the group of tackers. Mechanism substantially as disclosed in United States Letters Patent No. 1,949,539, granted on March 6, 1934 on an application of Joseph Gouldbourn, Fred Ricks, and William T. B. Roberts, is provided for rendering either one of the tack pots and its associated separator operative selectively at the will of the operator. The hand lever 391 is also arranged to control fingers 600 (Fig. 1) which are movable into the paths of lugs on the tack pots in a manner disclosed in the above-mentioned Letters Patent to prevent the separation and delivery of tacks, and accordingly the upward movement of the hand lever to render the drivers inoperative as above described serves also to move these fingers into such positions that during the repeated upper-conforming operation in the first stage of the next cycle no second set of tacks will be delivered to the tackers.

In case any tacks should have become jammed in the driver passages, it may be desired to run the machine idly and to impel the drivers down the passages to clear such tacks therefrom. In that case, however, it is obviously desirable that no additional tacks be fed into the passages. The construction is therefore further such that before the hand lever 391 has been moved far enough to prevent the member 281 from operating on the latch 280 the fingers 600 are moved into such positions as to prevent separation and delivery of tacks. The drivers may accordingly be operated as many times as desired in successive cycles of the machine without the delivery of any tacks to the tackers.

The mechanisms for raising the tack drivers and the tacker arms near the end of the cycle are so controlled that the tacker arms normally begin their upward movement before the tack drivers, and if the springs 269 should have been prevented as above described from operating the drivers, the upward movement of the tacker arms relatively to the drivers would cause the tacks in the driver passages to be pushed out of the passages by the drivers so that they would fall into the machine. This may be prevented by use of a modified construction shown mainly in Fig. 28. For the purpose in view the cam which normally raises the crosshead 270 and the drivers has that part of its track which moves past the cam roll as the tubular slide 247 which carries the tacker arms is raised by its cam sufficiently widened to permit the crosshead to be raised with the slide 247 at the beginning of the movement of the latter, and mechanism shown in Fig. 28 is provided for thus raising the crosshead by the movement of the slide 247. This mechanism comprises an upstanding arm 406 pivoted at its lower end on a pin 408 in the slide 247 and bifurcated at its upper end to provide a pair of fingers 508 to the ends of which are secured thrust blocks 410. When the crosshead 270 is in its raised position with the springs 269 compressed, the thrust blocks 410 may be swung by the arm 406 into such positions that their upper ends underlie faces 412 on the crosshead, so as to lift the crosshead by the upward movement of the slide 247 in the return of the parts to starting positions. The arm 406 is arranged to be controlled by the hand lever 391 in such manner that as the hand lever is swung upwardly to carry the member 281 out from under the latch 280 the thrust blocks 410 are carried to positions under the faces 412. For this purpose a substantially vertical face 414 is formed on the arm 406 and is arranged to be engaged by a short pin 418 carried by the lever 395, the arm 406 being urged in a rearward direction to maintain its face 414 in contact with the pin 418 by a coil spring 420 extending around the pin 408 and connected to the arm. It will be understood that when the hand lever 391 occupies its normal position the arm 406 is held in an idle position by engagement of the pin 418 with the face 414.

It may further be desirable that at times the tacks be separated in the normal manner and later pushed out of the tack passages in an idle operation of the machine by the normal upward movement of the slide 247 relatively to the crosshead 270, in case the operator may wish to make sure that the tacks are being correctly delivered from the separators to the tackers. For this purpose a construction is further provided such that the latch-tripping member 281 may be swung forwardly into such position as not to operate on the latch 280 while the hand lever 391 remains in its normal position and therefore permits the separation of the tacks, the arm 406 remaining in its idle position under these conditions. As shown in Fig. 28, the connection between the lever 395 and the rod 393 comprises a pin 422 carried by the lever and a U-shaped slot in the rod. By raising the rod and swinging the lower end of the lever 395 rearwardly the pin 422 may be carried to a position such as to enter the rear leg of the U-shaped slot, thus swinging the plate 281 to its idle position without affecting the position of the hand lever 391. When this is done an extension of the pin 422 engages a tail piece 424 depending from the arm 406, thus causing the thrust blocks 410 to remain in their idle positions. If the hand lever 391 is used in the manner previously described the amount of rearward movement of the pin 422 is not so great as when the pin is moved by the operator to enter the rear leg of the U-shaped slot, but terminates with the pin in the position indicated at 426, in which position it will not have moved far enough to hold the thrust blocks 410 in their idle positions by its engagement with the tail piece 424.

The machine herein shown is particularly adapted to operate on previously pulled-over shoes of the McKay type, i. e., shoes in which the margin of the lasted upper lies throughout its width in generally parallel relation to the bottom of the last, the tacks for fastening the upper in lasted position being clinched against a metal sole plate on the last. Ordinarily a shoe presented to the machine will have already been side lasted and the usual pulling-over tack at the toe end will have been removed.

Having mounted a shoe on the jack and having made such of the adjustments hereinbefore described as he may consider necessary for the style and size of shoe, the operator depresses the treadle 11 to swing the jack rearwardly, assisting in effecting its rearward movement with his hands if he so desires. In this movement of the jack the toe-end gage 61 is moved downwardly to withdraw it from out of the way of the wipers and the toe band. The jack arrives in a substantially vertical position, determined by engagement of the tongue 15 with the members 17, before the treadle is completely depressed, and before completing the depression of the treadle, or later if desired, the operator may swing the shoe support member 27 horizontally to present the sides of the toe in better relation to the edges of the wipers. In completing the depression of the treadle the operator raises the jack post to carry the bottom of the forepart of the shoe against the holddown, the tongue 15 entering the grooves in the members 17 to lock the jack against forward movement. As the shoe is forced against the holddown it may be tipped with the toe rest and the heel-end support in response to pressure of the holddown thereon, in the manner previously described, so that the bottom of its toe end will lie in substantially parallel relation to the plane of the wipers. While holding the treadle depressed the operator then starts the power operation of the machine by pushing rearwardly against a starting member 400 (Fig. 1).

As the machine starts, the upper-spreading fingers 149, which then lie above the insole with their rear ends spaced heelwardly from the extreme toe end of the insole, as shown in Figs. 7 and 12, are moved downward until the main cam shaft 101 has rotated through about 20°, when they occupy positions in which they are almost but not quite in contact with the insole. They are then moved bodily rearward toward the end of the toe and are also swung apart about their pivots 151 until they occupy such positions that their lower faces are partly over the insole and partly beyond the edge of the insole, as shown in Figs. 13 and 14. In this movement of the fingers they sweep outwardly any portion of the margin of the upper materials which may lie over the insole and spread the margin outwardly from the edge of the insole. The fingers are then in such positions as to clamp the margin of the upper upon the top face of the wipers when the wipers in their upwiping movement arrive approximately at the edge of the insole. In the course of these movements of the fingers the lever 500 controlling the pawls 381 swings in the direction to cause the jack post to become supported through these pawls by the light spring 387. As soon as the fingers 149 have moved far enough to insure displacement of any of the upper materials from over that portion of the insole which is to be engaged by the plate 217, this plate begins its downward swinging movement which is completed after the fingers have come to a stop, the plate thus moving into engagement with the insole in a location between the fingers and the holddown foot 73, as shown in Fig. 13. In the course of the downward movement of this plate the wipers are closed against the sides of the toe and then begin their upwiping movement, the toe band 227 moving upwardly with them but not engaging the shoe. In this operation the edges of the wipers are pressed yieldingly against the upper at the sides of the toe if the yieldable cam plate 341 is permitted to remain in its yielding condition. Substantially at the end of their upwiping movement the wipers clamp the margin of the upper outspread against the fingers 149, as above described. The holddown is then moved downwardly a short distance and thereby depresses the shoe relatively to the wipers to complete the upwiping operation and to cause the upper to be tensioned somewhat heightwise of the toe by the cooperative action of the wipers and the spreading fingers. In this operation the jack post 7 is moved downwardly with the shoe against the resistance of the lighter spring 387, and at the end of the downward movement the jack post becomes supported also by the heavier spring 388.

At the end of the downward movement of the shoe the wipers are advanced and closed to wipe the margin of the upper inwardly over the insole. The relative positions of the parts shortly after the beginning of these movements of the wipers are indicated in Figs. 15 and 16. As these movements begin the upper-spreading fingers are held temporarily stationary, clamping the margin of the upper between them and the wipers while permitting it to be dragged from beneath them as necessary in response to the pull of the wipers thereon. When, however, the wipers have arrived about midway of their paths of inward movement, the fingers 149 begin to swing farther apart, and shortly thereafter they also begin to move bodily in a rearward direction while continuing their swinging movements. The forward ends of the fingers may thus move completely off the outspread margin of the upper before the bodily rearward movement of the fingers begins. It will be evident that by reason of the relative timing of the swinging and bodily movements of the fingers they have an outward wiping action on the different portions of the margin of the upper in directions substantially perpendicular to the edges of the wipers, thus not only assisting the wipers in wiping the upper tightly over the insole, but also insuring against the formation of any objectionably prominent wrinkles or pleats in the margin. As the movements of the fingers continue, they are carried completely away from over the wipers and are then lowered to inoperative positions below the level of the wipers, as illustrated in Figs. 17 and 18, so as not to interfere with the movements of the tackers into tacking positions. Shortly after the wipers have begun to wipe the margin of the upper inwardly, the insole-engaging plate 217 is swung upwardly to its starting position. As soon as the wipers arrive in their fully advanced and closed positions, the toe band 227 is applied in clamping engagement with the upper about the toe, the top edge of the band being substantially at the level of the lower faces of the wipers. The machine then comes automatically to a stop to permit the operator, as far as he may, to inspect the condition of the work. If he considers that the upper-conforming operation is satisfactory, he then starts the machine again to cause it to complete its cycle and to fasten the upper in lasted position. If, however, he thinks that for any reason the upper-conforming operation should preferably be repeated, he moves the hand lever 391 into position to prevent the driving of tacks and then starts the machine to cause it as it completes its cycle to release the shoe without fastening the upper.

When the machine is restarted, after having come to a stop at the end of the upper-conforming operation, the wipers are partially retracted and are then held stationary in positions indicated in Figs. 17 and 18. In these positions they remain pressed against a substantial portion of the width of the overlasted margin of the upper while exposing for the reception of tacks a portion of the margin previously acted upon by the wipers. The gang of tacker arms will have been advanced and closed somewhat, during the advancing and closing movements of the wipers, by the wiper-operating levers, as hereinbefore described, and after having been moved downwardly to bring their tack nozzles close to the wipers they are acted upon by the toggle devices 293, 297 to cause the ends of the nozzles to pass over the inner edges of the wipers and thereby lay inwardly over the insole any portion of the margin of the upper which may lie over the wiper edges. The tacker arms are thereafter moved farther downwardly to cause the tack nozzles to press the margin of the upper upon the insole. The tack drivers are then operated to drive the tacks through the upper and into the insole and to clinch them on the metal plate on the bottom of the last. Since the jack post is at this time supported by both springs 387 and 388 the shoe is held against downward yield under the thrust of the tack drivers. Just prior to the driving of the tacks the holddown is raised a short distance to permit the shoe to be forced more firmly up against the wipers by the jack springs. The tacks having been driven the tacking mechanism is withdrawn to its initial position, the holddown rises still farther, and the jack post is unlocked so that the post may immediately descend and the jack may swing forwardly to its initial position, the wipers being raised somewhat to facilitate the return of the shoe with the jack. The wipers, the spreading fingers, the toe band and the holddown then return to their starting positions and the machine comes to a stop.

Having described the invention, what I claim as new and desire to secure by Letters Patent of the United States is:

1. In a lasting machine, the combination with wipers for wiping the margin of an upper around an end of a shoe inwardly over the shoe bottom into lasted position, of a group of fastening-inserting devices arranged to insert fastenings all around the end of the shoe bottom to fasten the upper in lasted position, and means for moving said devices relatively to the wipers lengthwise of the shoe and for also moving some of them laterally of the shoe to position the several devices prior to the insertion of the fastenings.

2. In a lasting machine, the combination with wipers for wiping the margin of an upper around an end of a shoe inwardly over the shoe bottom into lasted position, of a group of fastening-inserting devices arranged to insert fastenings all around the end of the shoe bottom to fasten the upper in lasted position, and means for imparting to all said devices inward movements relatively to the wipers to positions farther inward than the edges of the wipers and for also moving them heightwise of the shoe to press on the margin of the upper prior to the insertion of the fastenings.

3. In a lasting machine, the combination with wipers for wiping the margin of an upper around an end of a shoe inwardly over the shoe bottom into lasted position, of a group of fastening-inserting devices arranged to insert fastenings all around the end of the shoe bottom to fasten the upper in lasted position, and means for moving said devices heightwise of the shoe toward the plane of the wipers and for also moving them lengthwise of the shoe relatively to the wipers and for imparting to some of them movements laterally of the shoe to position the several devices prior to the insertion of the fastenings.

4. In a lasting machine, the combination with wipers for wiping the margin of an upper around an end of a shoe inwardly over the shoe bottom into lasted position, of a group of fastening-inserting devices arranged to insert fastenings all around the end of the shoe bottom to fasten the upper in lasted position, and means for moving said devices heightwise of the shoe to positions close to the wipers, for moving them relatively to the wipers to positions farther inward than the edges of the wipers, and for also moving them farther heightwise of the shoe to press on the margin of the upper prior to the insertion of the fastenings.

5. In a lasting machine, the combination with wipers and means for moving them lengthwise and laterally of a shoe to wipe the margin of the upper around an end of the shoe inwardly over the shoe bottom into lasted position, of a group of fastening-inserting devices supported independently of the wipers and arranged to insert fastenings around the end of the shoe bottom to fasten the upper in lasted position, and means for imparting to said devices movements lengthwise and laterally of the shoe in paths similar to the paths of movement of the wipers to position them prior to the insertion of the fastenings.

6. In a lasting machine, the combination with wipers and means for moving them lengthwise and laterally of a shoe to wipe the margin of the upper around an end of the shoe inwardly over the shoe bottom into lasted position, of a group of fastening-inserting devices arranged to insert fastenings around the end of the shoe bottom to fasten the upper in lasted position, means for moving said devices heightwise of the shoe toward the plane of the wipers, and means for also imparting to said devices movements lengthwise and laterally of the shoe in paths similar to the paths of movement of the wipers to position them prior to the insertion of the fastenings.

7. In a lasting machine, the combination with wipers and means for moving them lengthwise and laterally of a shoe to wipe the margin of the upper around an end of the shoe inwardly over the shoe bottom into lasted position, of a group of fastening-inserting devices arranged to insert fastenings around the end of the shoe bottom to fasten the upper in lasted position, and members supported independently of the wipers for movements lengthwise and laterally of the shoe in paths similar to the paths of movement of the wipers, said members being connected to the fastening-inserting devices for imparting to said devices positioning movements prior to the insertion of the fastenings.

8. In a lasting machine, the combination with wipers and means for moving them lengthwise and laterally of a shoe to wipe the margin of the upper around an end of the shoe inwardly over the shoe bottom into lasted position, of a group of fastening-inserting devices arranged to insert fastenings around the end of the shoe bottom to fasten the upper in lasted position, and plates supported independently of the wipers for movements lengthwise and laterally of the shoe in paths similar to the paths of movement of the wipers and having slots through which said fastening-inserting devices extend for imparting to said devices positioning movements prior to the insertion of the fastenings.

9. In a lasting machine, the combination with wipers and means for moving them lengthwise and laterally of a shoe to wipe the margin of the upper around an end of the shoe inwardly over the shoe bottom into lasted position, of a group of fastening-inserting devices arranged to insert fastenings around the end of the shoe bottom to fasten the upper in lasted position, members mounted for movements lengthwise and laterally of the shoe in paths similar to the paths of movement of the wipers and connected to said fastening-inserting devices for imparting positioning movements to said devices, and means for moving said members lengthwise of the shoe relatively to the wipers.

10. In a lasting machine, the combination with wipers and means for moving them lengthwise and laterally of a shoe to wipe the margin of the upper around an end of the shoe inwardly over the shoe bottom into lasted position, of a group of fastening-inserting devices arranged to insert fastenings around the end of the shoe bottom to fasten the upper in lasted position, means for moving said devices heightwise of the shoe toward the plane of the wipers, and members mounted for movements lengthwise and laterally of the shoe in paths similar to the paths of movement of the wipers and connected to said devices for imparting to them positioning movements prior to the insertion of the fastenings, said members being movable heightwise of the shoe with said devices.

11. In a lasting machine, the combination with wipers arranged to act on a shoe positioned bottom upward to wipe the margin of the upper around an end of the shoe inwardly over the shoe bottom into lasted position, of a group of fastening-inserting devices above said wipers for inserting fastenings all around the end of the shoe bottom to fasten the upper in lasted position, said devices being suspended at their upper end for inward and outward swinging movements along the plane of the wipers, and means for swinging said devices inwardly to position them prior to the insertion of the fastenings.

12. In a lasting machine, the combination with wipers arranged to act on a shoe positioned bottom upward to wipe the margin of the upper around an end of the shoe inwardly over the shoe bottom into lasted position, of a group of fastening-inserting devices above said wipers for inserting fastenings all around the end of the shoe bottom to fasten the upper in lasted position, said devices being suspended at their upper ends for inward and outward swinging movements along the plane of the wipers, and members mounted for movements in paths similar to the paths of movement of the wipers and connected to said devices for swinging them inwardly to position them prior to the insertion of the fastenings.

13. In a lasting machine, the combination with wipers arranged to act on a shoe positioned bottom upward to wipe the margin of the upper around an end of the shoe inwardly over the shoe bottom into lasted position, of a group of fastening-inserting devices above said wipers for inserting fastenings all around the end of the shoe bottom to fasten the upper in lasted position, a support for said devices on which they are suspended for inward and outward swinging movements along the plane of the wipers, said support being movable downwardly to carry the devices toward the wipers in the lasting of each shoe, and means for swinging said devices inwardly to position them prior to the insertion of the fastenings.

14. In a lasting machine, the combination with wipers arranged to act on a shoe positioned bottom upward to wipe the margin of the upper around an end of the shoe inwardly over the shoe bottom into lasted position, of a group of fastening-inserting devices including drivers for inserting fastenings all around the end of the shoe bottom to fasten the upper in lasted position, said group of devices being located above the wipers and being suspended for inward and outward swinging movements along the plane of the wipers, means for swinging said devices inwardly to position them prior to the insertion of the fastenings, and a driver-operating member located between the upper and lower ends of said devices and relatively to which the devices are thus movable inwardly and outwardly.

15. In a lasting machine, the combination with wipers movable to wipe the margin of an upper around an end of a shoe inwardly over the shoe bottom into lasted position and thereafter reversely movable to uncover a portion only of the overwiped margin, of a group of fastening-inserting devices arranged to insert fastenings around the end of the shoe bottom to fasten the upper in lasted position, and means for moving said devices inward relatively to the wipers to bring them into positions farther inward than the edges of the partially retracted wipers prior to the insertion of the fastenings.

16. In a lasting machine, the combination with wipers movable to wipe the margin of an upper around an end of a shoe inwardly over the shoe bottom into lasted position and thereafter reversely movable to uncover a portion only of the overwiped margin, of a group of fastening-inserting devices arranged to insert fastenings around the end of the shoe bottom to fasten the upper in lasted position, and means for moving said devices inwardly along the wipers to positions farther inward than the edges of the partially retracted wipers and for also moving them heightwise of the shoe to press on the portion of the margin of the upper uncovered by the retractive movement of the wipers prior to the insertion of the fastenings.

17. In a lasting machine, the combination with wipers, and operating mechanism for moving said wipers lengthwise and laterally of a shoe to wipe the margin of the upper around an end of the shoe inwardly over the shoe bottom into lasted position, of a group of fastening-inserting devices arranged to insert fastenings around the end of the shoe bottom to fasten the upper in lasted position, means for imparting to said fastening-inserting devices positioning movements lengthwise and laterally of the shoe by the movement of said wiper-operating mechanism, and additional means for imparting to said devices inward movements over the shoe bottom relatively to the wipers.

18. In a lasting machine, the combination with wipers for wiping the margin of an upper around an end of a shoe inwardly over the shoe bottom into lasted position, of levers for imparting respectively to said wipers movements lengthwise and laterally of the shoe, a group of fastening-inserting devices arranged to insert fastenings around the end of the shoe bottom to fasten the upper in lasted position, and other levers arranged to be operated by said first-named levers to impart to said fastening-inserting devices positioning movements lengthwise and laterally of the shoe.

19. In a lasting machine, the combination with wipers, and operating mechanism for closing said wipers inwardly over the bottom of a shoe about an end of the shoe to wipe the margin of the upper into lasted position, of a group of fastening-inserting devices arranged to insert fastenings in the shoe bottom to fasten the upper in lasted position, means arranged to be operated by said wiper-operating mechanism to move said devices inwardly over the shoe bottom shorter distances than the wipers, and additional means for moving said devices relatively to the wipers into fastening-inserting positions.

20. In a lasting machine, the combination with wipers for wiping the margin of an upper around an end of a shoe inwardly over the shoe bottom into lasted position, of means comprising a lever for imparting inward movement to said wipers, a group of fastening-inserting devices arranged to insert fastenings in the shoe bottom to fasten the upper in lasted position, a lever arranged to be operated by said first-named lever to move said devices inwardly over the shoe bottom, and mechanism arranged to operate independently of said levers to move said devices farther inward relatively to the wipers.

21. In a lasting machine, the combination with end-lasting wipers, of means for operating said wipers to wipe the margin of an upper around an end of a shoe on a last inwardly over the shoe bottom and for thereafter partially retracting them to uncover a portion of the overwiped margin prior to the insertion of fastenings to fasten the upper, a device for clamping the upper against the last around the end of the shoe exteriorly of the shoe bottom, and means for operating said clamping device to clamp the upper only after the wipers have substantially completed their inward wiping movements over the shoe bottom and for maintaining it in clamping position during the partial retractive movements of the wipers.

22. In a power-operated lasting machine, the combination with end-lasting wipers, of means for operating said wipers to wipe the margin of an upper around an end of a shoe on a last inwardly over the shoe bottom and for thereafter partially retracting them to uncover a portion of the overwiped margin prior to the insertion of fastenings to fasten the upper, a flexible band for clamping the upper against the last around the end of the shoe exteriorly of the shoe bottom, and automatic means for applying said band in clamping relation to the upper only after the wipers have substantially completed their inward wiping movements over the shoe bottom and for maintaining it in clamping position during the partial retractive movements of the wipers.

23. In a lasting machine, the combination with end-lasting wipers for wiping the margin of an upper around an end of a last inwardly over an insole on the last, of a pair of flexible bands arranged to extend around the end of the last adjacent to the wipers to clamp the upper against the last exteriorly of the shoe bottom, one of said bands being positioned at the outer side of the other for pressing the other inwardly against the upper, means connected to the ends of both said bands for applying to them forces directed lengthwise of the last to render them effective to clamp the upper, and means arranged between the bands in locations spaced apart lengthwise of the edge of the shoe bottom for holding portions of the bands separated from each other and for applying the pressure of the outer band to portions only of the inner band.

24. In a lasting machine, the combination with toe-lasting wipers for wiping the margin of an upper around the toe end of a last inwardly over an insole on the last, of a pair of flexible metal bands arranged to extend around the toe end of the last adjacent to the wipers to clamp the upper against the last exteriorly of the shoe bottom, one of said bands being positioned at the outer side of the other for pressing the other inwardly against the upper, means connected to the ends of both said bands for applying to them forces directed lengthwise of the last to render them effective to clamp the upper, and spacing members arranged between the bands in locations opposite the sides of the toe for applying the pressure of the outer band to the inner band in those locations while maintaining openings between the bands in other locations forwardly and rearwardly of said members.

25. In a lasting machine, the combination with wipers for wiping the margin of an upper around the toe end of a shoe inwardly over the shoe bottom into lasted position, of upper-fastening means movable from a retracted position into a position close to said wipers prior to the upper-fastening operation, and upper-spreading means arranged to clamp the margin of the upper outspread over the wipers to control it in the wiping operation, said upper-spreading means being movable thereafter into a retracted position to make way for the upper-fastening means.

26. In a lasting machine, the combination with wipers for wiping the margin of an upper around the toe end of a shoe inwardly over the shoe bottom into lasted position, of fastening-inserting means movable heightwise of the shoe toward the wipers and inwardly over the shoe bottom preparatory to the insertion of fastenings to fasten the upper in lasted position, and upper-spreading means arranged to clamp the margin of the upper outspread over the wipers to control it in the wiping operation, said upper-spreading means being movable outwardly along the wipers and heightwise of the shoe away from the wipers to make way for the fastening-inserting means.

27. In a lasting machine, the combination with wipers for wiping the margin of an upper around the toe end of a shoe inwardly over the shoe bottom into lasted position, of a pair of fingers for clamping the margin of the upper outspread upon the wipers to control it in the wiping operation, said fingers being arranged to extend respectively along the different wipers and to swing outwardly over the wipers each about an axis located approximately at the end of the toe, and means for thus swinging the fingers outwardly and for also imparting to them in automatically determined time relation to their swinging movements bodily movement lengthwise of the shoe in an outward direction relatively to the shoe while in clamping engagement with the margin of the upper as the wipers are moved inwardly to wipe the upper over the shoe bottom.

28. In a lasting machine, the combination with wipers for wiping the margin of an upper around the toe end of a shoe inwardly over the shoe bottom into lasted position, of a pair of fingers for clamping the margin of the upper outspread upon the wipers to control it in the wiping operation, said fingers being arranged to extend respectively along the different wipers and to swing outwardly over the wipers each about an axis located approximately at the end of the toe, and means for thus swinging the fingers outwardly while in clamping engagement with the margin of the upper as the wipers are moved inwardly to wipe the upper over the shoe bottom and for also imparting to said fingers, only after the beginning of their swinging movements, bodily movement lengthwise of the shoe in an outward direction relatively to the shoe.

29. In a lasting machine, the combination with wipers for wiping the margin of an upper around the toe end of a shoe inwardly over the shoe bottom into lasted position, of a pair of fingers for clamping the margin of the upper outspread upon the wipers to control it in the wiping operation, said fingers being arranged to extend respectively along the different wipers and to swing outwardly over the wipers each about an axis located approximately at the end of the toe, and means for maintaining said fingers stationary as the wipers begin to wipe the upper inwardly over the shoe bottom and for thereafter swinging them outwardly and also moving them bodily lengthwise of the shoe in an outward direction relatively to the shoe as the wipers continue their inward wiping movements.

30. In a power-operated lasting machine, the combination with wipers for wiping an upper around the toe end of a shoe heightwise of the shoe and for thereafter wiping its margin inwardly over the shoe bottom, of a device for clamping the margin of the upper outspread upon the wipers to control it as it is wiped inwardly over the shoe bottom, and automatic means for rendering said device effective thus to clamp the margin of the upper on the wipers only after the beginning but prior to the completion of the wiping action of the wipers heightwise of the shoe to cause said device and the wipers together to tension the upper heightwise of the shoe during the completion of such wiping action.

31. In a power-operated lasting machine, the combination with wipers for wiping an upper around the toe end of a shoe heightwise of the shoe and for thereafter wiping its margin inwardly over the shoe bottom, of a device for clamping the margin of the upper outspread upon the wipers to control it as it is wiped inwardly over the shoe bottom, and automatic means to cause said device to hold the margin of the upper outspread relatively to the edge of the shoe bottom while the wipers wipe the upper a substantial distance heightwise of the shoe prior to the clamping of said margin on the wipers.

32. In a power-operated lasting machine, the combination with wipers for wiping an upper around the toe end of a shoe heightwise of the shoe and for thereafter wiping its margin inwardly over the shoe bottom, of a device for clamping the margin of the upper outspread upon the wipers to control it as it is wiped inwardly over the shoe bottom, and automatic means for operating said device to spread the margin of the upper outwardly from the edge of the shoe bottom and for then maintaining said device in such relation to the edge of the shoe bottom as to clamp the margin of the upper on the wipers only when the wipers have approximately completed their wiping action heightwise of the shoe.

33. In a power-operated lasting machine, the combination with wipers movable to wipe an upper around the toe end of a shoe heightwise of the shoe and thereafter to wipe its margin inwardly over the shoe bottom, of a device for clamping the margin of the upper outspread upon the wipers to control it as it is wiped inwardly over the shoe bottom, and automatic means for positioning said device in such relation to the edge of the shoe bottom as to clamp the margin of the upper upon the wipers in response to the movement of the wipers heightwise of the shoe when the wipers arrive near the edge of the shoe bottom.

34. In a power-operated lasting machine, the combination with wipers movable to wipe an upper around the toe end of a shoe heightwise of the shoe and thereafter to wipe its margin inwardly over the shoe bottom, of a device for clamping the margin of the upper outspread upon the wipers to control it as it is wiped inwardly over the shoe bottom, and automatic means for operating said device to spread the margin of the upper outwardly from the edge of the shoe bottom and for then maintaining said device with a portion only of its upper-engaging face extending beyond the edge of the shoe bottom for clamping the upper upon the wipers when the wipers arrive near the edge of the shoe bottom in their wiping movement heightwise of the shoe.

35. In a power-operated lasting machine, the combination with wipers for wiping an upper around the toe end of a shoe heightwise of the shoe and for thereafter wiping its margin inwardly over the shoe bottom, of means for moving the wipers heightwise of the shoe in wiping engagement with the upper and for thereafter moving the shoe relatively to the wipers to complete the wiping of the upper heightwise of the shoe, a device for clamping the margin of the upper outspread upon the wipers to control it as it is wiped inwardly over the shoe bottom, and automatic means for rendering said device effective to clamp the upper upon the wipers when the wipers have substantially completed their wiping movement heightwise of the shoe to cause said device and the wipers together to tension the upper heightwise of the shoe as the shoe is thereafter moved relatively to the wipers.

36. In a power-operated lasting machine, the combination with wipers for wiping an upper around the toe end of a shoe heightwise of the shoe and for thereafter wiping its margin inwardly over the shoe bottom, of means for moving the wipers heightwise of the shoe in wiping engagement with the upper and for thereafter moving the shoe relatively to the wipers to complete the wiping of the upper heightwise of the shoe, a device for clamping the margin of the upper outspread upon the wipers to control it as it is wiped inwardly over the shoe bottom, and automatic means for positioning said device in such relation to the edge of the shoe bottom as to clamp the margin of the upper on the wipers in response to the movement of the wipers heightwise of the shoe substantially at the end of that movement and for thereafter maintaining said device in clamping position as the shoe is moved relatively to the wipers.

37. In a power-operated lasting machine, the combination with wipers for wiping an upper around the toe end of a shoe heightwise of the shoe and for thereafter wiping its margin inwardly over the shoe bottom, of means for moving the wipers in a direction heightwise of the shoe in wiping engagement with the upper and for thereafter moving the shoe relatively to the wipers in the opposite direction, a device for clamping the margin of the upper outspread upon the wipers, and automatic means for rendering said device effective thus to clamp the upper substantially at the end of the movement of the wipers heightwise of the shoe and for thereafter maintaining it in clamping position to cause said device and the wipers together to tension the upper in response to the movement of the shoe relatively to the wipers.

38. In a lasting machine, the combination with wipers for wiping an upper around the toe end of a shoe heightwise of the shoe and for thereafter wiping its margin inwardly over the shoe bottom, of means for moving said wipers heightwise of the shoe in wiping engagement with the upper, means for clamping the margin of the upper upon the wipers when the wipers arrive near the edge of the shoe bottom in their movement heightwise of the shoe, and means for thereafter moving the shoe heightwise relatively to the wipers to cause said device and the wipers to tension the upper.

39. In a lasting machine, the combination with wiping means for wiping a shoe upper heightwise of the shoe and for thereafter wiping its margin inwardly over the shoe bottom, of cam means having a yieldable portion arranged to hold the wiping means yieldingly against the upper in the wiping of the upper heightwise of the shoe and having also an unyieldable portion arranged to act positively on the wiping means to wipe the margin of the upper inwardly over the shoe bottom.

40. In a lasting machine, the combination with wipers for wiping an upper around the toe end of a shoe heightwise of the shoe and for thereafter wiping its margin inwardly over the shoe bottom, of cam means for closing said wipers laterally of the shoe, said cam means having a yieldable portion arranged to control the wipers yieldingly in the wiping of the upper heightwise of the shoe and another portion arranged to control the wipers positively in wiping the margin of the upper inwardly over the shoe bottom.

41. In a lasting machine, the combination with wipers for wiping an upper around the toe end of a shoe heightwise of the shoe and for thereafter wiping its margin inwardly over the shoe bottom, of a cam for closing said wipers laterally of the shoe, said cam having a spring-controlled portion yieldable in response to wedging action of the shoe on the wipers in the wiping of the upper heightwise of the shoe and having also an unyieldable portion arranged to act positively on the wipers to force them inwardly over the shoe bottom.

42. In a lasting machine, the combination with wiping means for wiping a shoe upper heightwise of the shoe and for thereafter wiping its margin inwardly over the shoe bottom, of cam means having a yieldable portion arranged to hold the wiping means yieldingly against the upper in the wiping of the upper heightwise of the shoe and having also an unyieldable portion arranged to act positively on the wiping means to wipe the margin of the upper inwardly over the shoe bottom, and mechanism for rendering said yieldable portion of the cam means unyieldable in its action on the wiping means at the will of the operator.

43. In a lasting machine, the combination with wipers for wiping an upper around the toe end of a shoe heightwise of the shoe and for thereafter wiping its margin inwardly over the shoe bottom, of a cam for closing said wipers laterally of the shoe, said cam having a spring-controlled portion arranged to control the wipers yieldingly in the wiping of the upper heightwise of the shoe and another portion arranged to force the wipers positively inward over the shoe bottom, and means movable at the will of the operator to render said spring-controlled portion of the cam positive in its action on the wipers.

44. In a lasting machine, the combination with wiping means for wiping a shoe upper heightwise of the shoe and for thereafter wiping its margin inwardly over the shoe bottom, of means for holding said wiping means either yieldingly or unyieldingly against the upper at the will of the operator in the wiping of the upper heightwise of the shoe.

45. In a lasting machine, the combination with wiping means for wiping a shoe upper heightwise of the shoe and for thereafter wiping its margin inwardly over the shoe bottom, of cam means having different portions for use alternatively at the will of the operator to hold the wiping means either yieldingly or unyieldingly against the upper in the wiping of the upper heightwise of the shoe.

46. In a lasting machine, the combination with wipers for wiping an upper around the toe end of a shoe heightwise of the shoe and for thereafter wiping its margin inwardly over the shoe bottom, of a cam for closing said wipers laterally of the shoe, said cam having different portions, one yieldable and the other unyieldable, for use alternatively at the will of the operator to hold the wipers either yieldingly or positively in engagement with the upper in the wiping of the upper heightwise of the shoe.

47. In a lasting machine, the combination with wipers for wiping an upper around the toe end of a shoe heightwise of the shoe and for thereafter wiping its margin inwardly over the shoe bottom, of a cam for closing said wipers laterally of the shoe, said cam comprising a yieldable member arranged to control the wipers yieldingly in the wiping of the upper heightwise of the shoe and also an unyieldable member adjacent to said yieldable member for use alternatively at the will of the operator to control the wipers positively in that operation, and means for moving said yieldable member to an inactive position and for maintaining it in that position when the unyieldable member is in use.

48. In a lasting machine, the combination with wipers for wiping an upper around the toe end of a shoe heightwise of the shoe and for thereafter wiping its margin inwardly over the shoe bottom, of cam means for closing said wipers laterally of the shoe, said cam means having a yieldable portion arranged to control the wipers yieldingly in the wiping of the upper heightwise of the shoe and another portion arranged for use alternatively at the will of the operator to control the wipers positively in that operation, said other portion of the cam means being so formed as to impart to the wipers an inward closing movement in the latter portion of the operation of wiping the upper heightwise of the shoe.

49. In a lasting machine, the combination with wipers for wiping an upper around the toe end of a shoe heightwise of the shoe and for thereafter wiping its margin inwardly over the shoe bottom, of a cam for closing said wipers laterally of the shoe and for holding them pressed against the upper in the wiping of the upper heightwise of the shoe, said cam being so formed as to impart to the wipers an inward closing movement in the latter portion of the operation of wiping the upper heightwise of the shoe.

50. In a lasting machine, the combination with toe-lasting means, of a shoe support movable to present a shoe to said lasting means, and a toe-end gage carried by the shoe support for use in determining the position of the toe-end face of a shoe on said support.

51. In a lasting machine, the combination with toe-lasting means, of a shoe support movable to present a shoe to said lasting means, a toe-end gage carried by the shoe support for use in determining the position of the toe-end face of a shoe on said support, and means for withdrawing said gage from operative position as the shoe support is moved to present the shoe to the lasting means.

52. In a lasting machine, the combination with toe-lasting means, of a shoe support movable to present a shoe to said lasting means, a toe-end gage carried by the shoe support for use in determining the position of the toe-end face of a shoe on said support, and mechanism for withdrawing said gage from operative position in response to the movement of the shoe support to present the shoe to the lasting means.

53. In a lasting machine, the combination with toe-lasting means, of a shoe support movable to present a shoe to said lasting means, a toe-end gage carried by the shoe support for use in determining the position of the toe-end face of a shoe on said support, a lever on the shoe support, and a relatively stationary member arranged to act on said lever to withdraw the gage from operative position in response to the movement of the shoe support to present the shoe to the lasting means.

54. In a lasting machine, the combination with end-lasting means, of a shoe support movable in a direction lengthwise of a shoe thereon to carry the shoe toward said lasting means and including a shoe holder mounted to turn with the shoe about an axis extending heightwise of the shoe, and cooperating members supported respectively on said shoe holder to turn therewith and on the frame of the machine and arranged to interlock to prevent reverse movement of the shoe support in a direction lengthwise of the shoe, said members being so formed as to permit the turning of the shoe holder while the members are in interlocking relation.

55. In a lasting machine, the combination with end-lasting means, of a shoe support moving in a direction lengthwise of a shoe thereon to carry the shoe toward said lasting means and including a shoe holder movable also in a direction heightwise of the shoe prior to the lasting operation, said shoe holder being mounted to turn with the shoe about an axis extending heightwise of the shoe, and cooperating members supported respectively on said shoe holder to turn therewith and on the frame of the machine and arranged to interlock in response to the movement of the shoe holder in a direction heightwise of the shoe to prevent reverse movement of the shoe support in a direction lengthwise of the shoe, said members being so formed as to permit the turning of the shoe holder while the members are in interlocking relation.

56. In a lasting machine, the combination with toe-lasting means, of a jack movable in a direction lengthwise of a shoe thereon to carry the shoe toward said lasting means and including a jack post also movable with the shoe in a direction heightwise of the shoe prior to the lasting operation, said jack post being mounted to turn with the shoe about an axis extending heightwise of the shoe in the vicinity of its toe end, and cooperating members supported respectively on said jack post to turn therewith and on the frame of the machine and arranged to interlock in response to the movement of the jack post in a direction heightwise of the shoe to prevent reverse movement of the jack in a direction lengthwise of the shoe, said members being so formed as to permit the turning of the jack post while the members are in interlocking relation.

57. In a lasting machine, the combination with toe-lasting means, of a shoe-positioning device arranged to engage the bottom of a shoe to determine the relation of the bottom face of the toe end of the shoe to said lasting means, and shoe-supporting means arranged to engage the forepart of the shoe and mounted to tip with the shoe in response to pressure of said device on the bottom of the shoe to permit the shoe to assume a position determined by said device.

58. In a lasting machine, the combination with toe-lasting means, of a shoe-positioning device arranged to engage the bottom of the forepart of a shoe to determine the relation of the bottom face of the toe end of the shoe to said lasting means, and shoe-supporting means mounted to tip with the shoe about an axis located substantially at the bottom of the toe end of the shoe in response to pressure of said device on the shoe to permit the shoe to assume a position determined by said device.

59. In a lasting machine, the combination with toe-lasting means, of a shoe-positioning device arranged to engage the bottom of the forepart of a shoe to determine the relation of the bottom face of the toe end of the shoe to said lasting means, and shoe-supporting means mounted to tip with the shoe about axes extending respectively lengthwise and laterally of the shoe in response to pressure of said device on the shoe to permit the shoe to assume a position determined by said device.

60. In a lasting machine, the combination with toe-lasting means, of a shoe-positioning device arranged to engage the bottom of a shoe to determine the relation of the bottom face of the toe end of the shoe to said lasting means, and shoe-supporting means comprising a toe rest and a heel-end support both mounted to tip as a unit with the shoe in response to pressure of said device on the bottom of the shoe to permit the shoe to assume a position determined by said device.

61. In a lasting machine, the combination with toe-lasting means, of a shoe-positioning device arranged to engage the bottom of a shoe to determine the relation of the bottom face of the toe end of the shoe to said lasting means, a toe rest movable with the shoe about axes extending respectively lengthwise and laterally of the shoe in response to pressure of said device on the bottom of the shoe to permit the shoe to assume a position determined by said device, and a heel-end support movable with the toe rest about the same axis extending laterally of the shoe.

62. In a lasting machine, the combination with toe-lasting means, of a holddown for engaging the bottom of the forepart of a shoe to determine the relation of the bottom face of the toe end of the shoe to said lasting means, and shoe-supporting means comprising a toe rest mounted to tip with the shoe about different axes located substantially at the bottom of the toe end of the shoe in response to pressure of the holddown on the shoe to permit the shoe to assume a position determined by the holddown.

63. In a lasting machine, the combination with toe-lasting means, of a holddown for engaging the bottom of the forepart of a shoe to determine the relation of the bottom face of the toe end of the shoe to said lasting means, a toe rest for supporting the toe end of the shoe, a support for said toe rest having an arc-shaped guideway along which the toe rest is movable about an axis extending lengthwise of the shoe substantially at the bottom of the toe end of the shoe, and means provided with an arc-shaped guideway along which said support is movable with the toe rest about an axis extending laterally of the shoe substantially at the bottom of its toe end, the toe rest being movable about said axes in response to pressure of the holddown on the shoe to permit the shoe to assume a position determined by the holddown.

64. In a lasting machine, the combination with toe-lasting means, of a holddown for engaging the bottom of the forepart of a shoe to determine the relation of the bottom face of the toe end of the shoe to said lasting means, and shoe-supporting means comprising a toe rest and a heel-end support both mounted to move as a unit with the shoe about an axis extending laterally of the shoe substantially at the bottom of its toe end in response to pressure of the holddown on the shoe to permit the shoe to assume a position determined by the holddown, the toe rest being additionally movable in response to said pressure about an axis extending lengthwise of the shoe substantially at the bottom of its toe end.

65. In a lasting machine, the combination with toe-lasting means, of a holddown for engaging the bottom of the forepart of a shoe to determine the relation of the bottom face of the toe end of the shoe to said lasting means, a toe rest supporting the toe end of the shoe and mounted to tip with the shoe about an axis extending lengthwise of the shoe in response to pressure of the holddown on the shoe to permit the shoe to assume a position determined by the holddown, and a heel-end support formed to embrace the heel end of the shoe and movable about an axis extending lengthwise of the shoe as the shoe is thus tipped.

66. In a lasting machine, the combination with toe-lasting means, of a holddown for engaging the bottom of the forepart of a shoe to determine the relation of the bottom face of the toe end of the shoe to said lasting means, and shoe-supporting means movable to carry the shoe heightwise into engagement with said holddown and mounted to tip with the shoe in response to pressure of the holddown on the shoe to permit the shoe to assume a position determined by the holddown.

67. In a lasting machine, the combination with toe-lasting means, of a holddown for engaging the bottom of the forepart of a shoe to determine the relation of the bottom face of the toe end of the shoe to said lasting means, and shoe-supporting means movable to carry the shoe heightwise into engagement with said holddown, said shoe-supporting means comprising a toe rest movable about different axes extending respectively lengthwise and laterally of the shoe in response to pressure of the holddown on the shoe to permit the shoe to assume a position determined by the holddown.

68. In a lasting machine, the combination with toe-lasting means, of a holddown for engaging the bottom of the forepart of a shoe to determine the relation of the bottom face of the toe end of the shoe to said lasting means, and a jack movable to carry the shoe lengthwise toward the lasting means, said jack including a jack post located substantially under the toe end of the shoe and movable upwardly to carry the shoe into engagement with the holddown, the jack post having thereon shoe-supporting means mounted to tip with the shoe in response to pressure of the holddown on the shoe to permit the shoe to assume a position determined by the holddown.

69. In a lasting machine, the combination with toe-lasting means, of a holddown for engaging the bottom of the forepart of a shoe to determine the relation of the bottom face of the toe end of the shoe to said lasting means, and a jack movable to carry the shoe lengthwise toward the lasting means, said jack including a jack post located substantially under the toe end of the shoe and movable upwardly to carry the shoe into engagement with the holddown, the jack post having thereon a toe rest mounted to tip with the shoe about different axes extending respectively lengthwise and laterally of the shoe in response to pressure of the holddown on the shoe to permit the shoe to assume a position determined by the holddown.

70. In a lasting machine, the combination with toe-lasting means, of a holddown for engaging the bottom of the forepart of a shoe to determine the relation of the bottom face of the toe end of the shoe to said lasting means, and a jack mounted for swinging movement to carry the shoe toward the lasting means, said jack including a jack post located substantially under the toe end of the shoe and movable upwardly to carry the shoe into engagement with the holddown, the jack post having thereon a toe rest and a heel-end support for the shoe both movable with the shoe about an axis extending laterally of the shoe in the vicinity of its toe end to permit the shoe to assume a position determined by the holddown.

71. In a lasting machine, the combination with means for wiping an upper around an end of a shoe into lasted position, and means for driving fastenings into the bottom of the shoe to fasten the upper, of mechanism for moving the shoe heightwise relatively to said wiping means by engaging the bottom of the shoe, a spring yieldable in response to such movement of the shoe, and another spring arranged to be rendered effective by such movement of the shoe to assist in resisting further movement thereof in the same direction when the fastenings are driven.

72. In a lasting machine, the combination with means for wiping an upper around an end of a shoe into lasted position, and means for driving fastenings into the bottom of the shoe to fasten the upper, of mechanism for moving the shoe heightwise relatively to said wiping means by engaging the bottom of the shoe, a member rotatable in response to such movement of the shoe, a spring controlling said member and yieldable as the member is rotated, and another spring arranged to control said member and to be rendered effective by such movement of the shoe to assist in resisting further movement thereof in the same direction when the fastenings are driven.

73. In a lasting machine, the combination with means for wiping an upper around an end of a shoe into lasted position, and means for driving fastenings into the bottom of the shoe to fasten the upper, of mechanism for moving the shoe heightwise relatively to said wiping means by engaging the bottom of the shoe, a jack post movable with the shoe, a pinion rotatable by the movement of the jack post, a comparatively light spring arranged to control said pinion and yieldable in response to the movement of the jack post, and a heavier spring arranged to control said pinion and to be rendered effective by the movement of the jack post to assist in resisting further movement thereof in the same direction when the fastenings are driven.

74. In a power-operated lasting machine, the combination with end-lasting means, of a holddown for engaging the bottom of a shoe positioned bottom upward for the lasting operation, a member for supporting the shoe, a treadle for operating said member to raise the shoe against the holddown prior to the starting of the power operation of the machine, automatic means arranged to assume control of said member after the starting of the machine, and power-operated mechanism for rendering the treadle ineffective to control said member after said automatic means has become effective.

75. In a power-operated lasting machine, the combination with end-lasting means, of a holddown for engaging the bottom of a shoe positioned bottom upward for the lasting operation, a member for supporting the shoe, a treadle for operating said member to raise the shoe against the holddown prior to the starting of the power operation of the machine, a device arranged to assume control of said member after the starting of the power operation of the machine and later to release the member to permit its return to starting position, and automatic means for interrupting control of said member by the treadle to prevent the treadle if still depressed from interfering with the return of said member.

76. In a power-operated lasting machine, the combination with end-lasting means, of a holddown for engaging the bottom of a shoe positioned bottom upward for the lasting operation, a jack including an upwardly movable jack post for supporting the shoe, a treadle for raising said jack post to carry the shoe against the holddown prior to the starting of the power operation of the machine, a pawl-and-ratchet device arranged to assume control of said jack post after the starting of the power operation of the machine and later to release the jack post to permit its return to starting position, and automatic means for interrupting control of the jack post by the treadle to prevent the treadle if still depressed from interfering with the return of the jack post.

WILLIAM THOMAS BUCKINGHAM ROBERTS.